US012506368B2

(12) United States Patent
Ettes et al.

(10) Patent No.: US 12,506,368 B2
(45) Date of Patent: Dec. 23, 2025

(54) FOREIGN OBJECT DETECTION IN A WIRELESS POWER TRANSFER SYSTEM

(71) Applicant: KONINKLIJKE PHILIPS N.V., Eindhoven (NL)

(72) Inventors: Wilhelmus Gerardus Maria Ettes, Leeuwarden (NL); Eddy Gerrit Veltman, Steenbergen (NL); Andries Van Wageningen, Wijlre (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/748,283

(22) Filed: Jun. 20, 2024

(65) Prior Publication Data
US 2024/0339871 A1  Oct. 10, 2024

Related U.S. Application Data

(63) Continuation of application No. 16/646,350, filed as application No. PCT/EP2018/074892 on Sep. 14, 2018, now Pat. No. 12,046,921.

(30) Foreign Application Priority Data

Sep. 18, 2017 (EP) ..................... 17191588

(51) Int. Cl.
H02J 50/60 (2016.01)
H02J 50/12 (2016.01)
H02J 50/80 (2016.01)
(52) U.S. Cl.
CPC .............. H02J 50/60 (2016.02); H02J 50/12 (2016.02); H02J 50/80 (2016.02)
(58) Field of Classification Search
CPC ............. H02J 50/60; H02J 50/80; H02J 50/12
See application file for complete search history.

(56) References Cited

U.S. PATENT DOCUMENTS 8,274,254 B2   9/2012  Kamijo et al.
9,479,013 B2  10/2016  Joye et al.
(Continued)

FOREIGN PATENT DOCUMENTS

EP   3410568 A1   12/2018

OTHER PUBLICATIONS

Qi Specification Downloaded From www.wirelesspowerconsortium.com on Mar. 4, 2020.
(Continued)

Primary Examiner — Menatoallah Youssef
Assistant Examiner — Khareem E Almo

(57) ABSTRACT

According to some implementations, a wireless power transmitter and a wireless power receiver of a wireless power system are disclosed. According to one aspect, the wireless power transmitter includes a wireless power transmitter circuit configured to generate a power transfer signal, a driver circuit configured to generate a drive signal for the wireless power transmitter circuit during a power transfer time interval. The wireless power transmitter includes an adapter circuit configured to generate a varying test drive signal during an adaptation time interval by varying at least one of a frequency, voltage, current, duty cycle, signal level, or amplitude of the test drive signal. Wireless power transmitter is configured to perform foreign object detection based on the signal parameter determined by the adapter circuit. According to some implementations, the wireless power receiver is configured to transmit messages which indicate the timing for detection of the signal parameter by the adapter circuit.

20 Claims, 14 Drawing Sheets

(56) References Cited

U.S. PATENT DOCUMENTS

| | | | |
|---|---|---|---|
| 9,595,834 B2 * | 3/2017 | Yamamoto | H02J 50/12 |
| 9,716,388 B2 | 7/2017 | Van Wageningen | |
| 9,728,982 B2 * | 8/2017 | Yamamoto | H02J 50/402 |
| 10,097,047 B2 * | 10/2018 | Yamamoto | H02J 50/60 |
| 10,103,584 B2 | 10/2018 | Van Wageningen et al. | |
| 10,374,660 B2 | 8/2019 | Tsukamoto | |
| 10,545,180 B2 | 1/2020 | Van Wageningen | |
| 2015/0162752 A1 | 6/2015 | Endo | |
| 2015/0349541 A1 * | 12/2015 | Yamamoto | H02J 50/402 |
| | | | 307/104 |
| 2015/0349542 A1 * | 12/2015 | Yamamoto | H02J 50/12 |
| | | | 307/104 |
| 2015/0349543 A1 | 12/2015 | Sakata et al. | |
| 2016/0149440 A1 | 5/2016 | Staring et al. | |
| 2017/0033609 A1 | 2/2017 | Nakamura et al. | |
| 2017/0288412 A1 * | 10/2017 | Yamamoto | H02J 50/70 |
| 2018/0069435 A1 | 3/2018 | Sakata et al. | |
| 2019/0064353 A1 * | 2/2019 | Nugent, Jr. | G01S 17/04 |
| 2019/0068001 A1 * | 2/2019 | Lovas | H02J 50/60 |
| 2019/0334388 A1 * | 10/2019 | Van Wageningen | H02J 50/60 |

OTHER PUBLICATIONS

International Search Report and Written Opinion from PCT/EP2018/074892 mailed Oct. 22, 2018.

* cited by examiner

FOREIGN OBJECT DETECTION IN A WIRELESS POWER TRANSFER SYSTEM

CROSS REFERENCE TO RELATED APPLICATIONS

This application is a continuation and claims priority under 35 U.S.C. § 120 of U.S. application Ser. No. 16/646,350, filed on Mar. 11, 2020, which is a U.S. National Phase application under 35 U.S.C. § 371 of International Application No. PCT/EP2018/074892, filed on Sep. 14, 2018, which claims the benefit of priority of European Patent Application No. EP 17191588.7, filed on Sep. 18, 2017, each of which is incorporated by reference herein in its entirety.

FIELD

The disclosure relates to foreign object detection in a wireless power transfer system. According to some implementations, embodiments are directed to foreign object detection for a power transmitter providing inductive power transfer to power devices. According to some implementations, power devices may include, but are not limited to, high power devices, such as kitchen appliances.

BACKGROUND

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

A potential problem with wireless power transfer is that power may unintentionally be transferred to e.g. metallic objects that happen to be in the vicinity of the power transmitter. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may be highly disadvantageous.

In order to reduce the risk of such scenarios arising, it has been proposed to introduce foreign object detection where the power transmitter can detect the presence of a foreign object and reduce the transmit power and/or generate a user alert when a positive detection occurs. For example, the Qi system includes functionality for detecting a foreign object, and for reducing power if a foreign object is detected. Specifically, Qi specification version 1.2.1, section 11 describes various methods of detecting a foreign object.

One method to detect such foreign objects is disclosed in WO2015018868A1. Another example is provided in WO 2012127335 which discloses an approach based on determining unknown power losses. In the approach, both the power receiver and the power transmitter measure their power, and the receiver communicates its measured received power to the power transmitter. When the power transmitter detects a significant difference between the power sent by the transmitter and the power received by the receiver, an unwanted foreign object may potentially be present, and the power transfer may be reduced or aborted for safety reasons. This power loss method requires synchronized accurate power measurements performed by the power transmitter and the power receiver.

For example, in the Qi power transfer standard, the power receiver estimates its received power e.g. by measuring the rectified voltage and current, multiplying them and adding an estimate of the internal power losses in the power receiver (e.g. losses of the rectifier, the receiver coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. the estimated power loss in the inverter, the primary coil, and metal parts that are part of the power transmitter.

The power transmitter can estimate the power loss by subtracting the reported received power from the transmitted power. If the difference exceeds a threshold, the transmitter will assume that too much power is dissipated in a foreign object, and it can then proceed to terminate the power transfer.

Alternatively, it has been proposed to measure the quality or Q-factor of the resonant circuit formed by the primary and secondary coils together with the corresponding capacitances and resistances. A reduction in the measured Q-factor may be indicative of a foreign object being present.

In practice, it tends to be difficult to achieve sufficient detection accuracy using the methods described in the Qi specification. This difficulty is exacerbated by a number of uncertainties about the specific current operating conditions.

For example, a particular problem is the potential presence of friendly metals (i.e. metal parts of the device that embodies the power receiver or the power transmitter) as the magnetic and electrical properties of these may be unknown (and vary between different devices) and therefore may be difficult to compensate for.

Further, undesirable heating may result from even relatively small amounts of power being dissipated in a metallic foreign object. Therefore, it is necessary to detect even a small power discrepancy between the transmitted and received power, and this may be particularly difficult when the power levels of the power transfer increase.

The Q factor degradation approach may in many scenarios have a better sensitivity for detecting the presence of metal objects. However, it may still not provide sufficient accuracy and e.g. may also suffer from the influence of friendly metal.

The performance of the foreign object detection is subject to the specific operating conditions that are present when the test is actually performed. For example, if, as described in the Qi specification, a measurement for foreign object detection is performed in the Selection Phase of a power transfer initialization process, the signal that the power transmitter provides for the measurement must be small enough to prevent that it wakes up the power receiver. However, for such a small signal, the signal/noise ratio is typically poor, resulting in reduced accuracy of the measurement.

Another issue is that foreign object detection is typically a very sensitive test where it is desired that relatively small changes caused by the presence of a foreign object is detected in an environment with possibly a large variation of the operating conditions and scenarios for which the test is being performed.

Accordingly, current algorithms tend to be suboptimal and may in some scenarios and examples provide less than optimum performance. In particular, they may result in the presence of foreign objects not being detected, or in false detections of foreign objects when none are present.

Hence, an improved object detection would be advantageous and, in particular, an approach allowing increased flexibility, reduced cost, reduced complexity, improved object detection, fewer false detections and missed detections, backwards compatibility, and/or improved performance would be advantageous.

SUMMARY

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an inductive power transfer signal; the power transmitter comprising: a transmitter coil for generating the power transfer signal; a driver for generating a drive signal for the transmitter coil, the driver being arranged to, during a power transfer phase, generate the drive signal to generate the power transfer signal during power transfer time intervals of a repeating time frame comprising at least one power transfer time interval and one foreign object detection time interval; a test coil for generating an electromagnetic test signal; a test generator arranged to generate a test drive signal for the test coil to generate the electromagnetic test signal during foreign object detection time intervals of the repeating time frame; a foreign object detector arranged to perform a foreign object detection test in response to a measured parameter for the test drive signal during the foreign object detection time intervals; an adapter arranged to control the test generator to generate a varying test drive signal for the test coil during an adaptation time interval by varying at least one of a frequency, voltage, current, duty cycle, signal level, and amplitude of the test drive signal, and to determine a test drive signal parameter value in response to the varying test drive signal, the test drive parameter value being a value of at least one of a frequency, voltage, current, duty cycle, signal level, and amplitude; a memory for storing the test drive signal parameter value; and wherein the test generator is arranged to set a signal property of the test drive signal during at least one foreign object detection time interval in response to the test drive signal parameter value.

The invention may provide improved foreign object detection in many embodiments. In many scenarios and systems, a more accurate foreign object detection may be achieved. The approach may in many embodiments reduce complexity and may in many systems provide a high degree of backwards compatibility. Specifically, the approach may be particularly suitable for improving foreign object detection in Qi wireless power transfer systems e.g. operating in accordance with version 1.2 or earlier of the Qi Specifications.

The approach may allow improved accuracy and/or reliability of foreign object detection tests during the power transfer phase. In many embodiments, the approach may reduce uncertainty and variation for the foreign object detection tests thereby improving performance. The approach may for example bias the system towards working at a specific, e.g. predetermined, reference scenario and operating point during the foreign object detection. This may improve consistency and predictability for the foreign object detection test. In particular, it may allow a more accurate and more reliable estimation of the impact of the power receiver on the electromagnetic test signal, and thus may allow the foreign object detector to improve compensation therefor.

In many embodiments, the approach may specifically control the power transmitter to generate an electromagnetic test signal which may be sufficiently low to result in the power receiver not extracting significant power (e.g. the load of the power receiver may be explicitly or implicitly disconnected due to the level of the electromagnetic test signal being sufficiently low) yet sufficiently high to allow accurate detection of the impact of a foreign object.

The approach may in many embodiments facilitate or improved determination of operating conditions for foreign object, and may in particular facilitate or improve determination of operating points providing improved trade-off between loading by the power receiver and detection of changes caused by foreign objects.

The test drive parameter value may be a frequency, voltage, current, signal level, and/or amplitude of the test drive signal.

In many embodiments, a duration of the foreign object detection time interval is no more than 5%, 10%, or 20% of the duration of the time frame. In many embodiments, the duration of the foreign object detection time interval(s) is no less than 70%, 80%, or 90% of the time frame.

The foreign object detector may be arranged to determine that a foreign object is detected if a difference between the power level of the electromagnetic test signal and the power indicated by a loading indication received from the power receiver and indicating an expected load of the electromagnetic test signal is above a threshold. If the difference is below the threshold, the foreign object detector may determine that no foreign object is detected.

The foreign object detector may be arranged to determine that a foreign object is detected if a quality measure (determined from measurements of the drive signal) for a resonance circuit comprising the test coil is below a threshold. The threshold may typically be dependent on a message received from the power receiver.

The test generator may be arranged to apply the test drive parameter value to the test drive signal during one or more foreign object detection time intervals subsequent to the adaptation time interval.

The adapter may be arranged to control the test generator to generate a varying test drive signal for the test coil by varying one or more parameters of the test drive signal including a voltage, current and/or power level or amplitude, a frequency, or a duty cycle of the test drive signal.

In many embodiments, the varying parameter of the varying test drive signal (at least one of a frequency, voltage, current, signal level, and amplitude of the test drive signal) is the same parameter for which the test drive parameter value is determined (the same parameter of the at least one of a frequency, voltage, current, signal level, and amplitude of the test drive signal).

The test generator (211) is arranged to set a signal property of the test drive signal during at least one foreign object detection time interval in response to the test drive signal parameter value, where the signal property is the at least one of the frequency, voltage, current, signal level, and amplitude of the test drive parameter value.

In accordance with an optional feature of the invention, the power transmitter further comprises a receiver for receiving messages from the power receiver, and wherein the adapter is arranged to determine the test drive signal parameter value in response to a message received from the power receiver.

This may in many embodiments provide improved foreign object detection operation, and may in many embodiments allow an improved determination of a suitable operating point for the foreign object detection during the foreign object detection time intervals. The approach may in particular allow the power transmitter operating point for the foreign object detection to be based on measurements performed at the power receiver.

In accordance with an optional feature of the invention, the adapter is arranged to determine the test drive signal parameter value in response to a varying property of the varying test drive signal at a time indicated by the message received from the power receiver.

This may in many embodiments allow for accurate determination of suitable operating points while maintaining low complexity of the determination.

In accordance with an optional feature of the invention, the adapter is arranged to measure a signal property of the test drive signal when varying the test drive signal; and to determine the test drive signal parameter value in response to the signal property.

This may in many embodiments provide improved foreign object detection operation, and may in many embodiments allow an improved determination of a suitable operating point for the foreign object detection during the foreign object detection time intervals.

The approach may in many embodiments allow for the determination of the test drive parameter value to be based (only) on operations by the power transmitter. In many embodiments, no operations are required by the power receiver during the adaptation time interval in order to determine the test drive parameter value. The approach may provide improved backwards compatibility, and in particular may accommodate already deployed legacy power receivers.

The signal property being determined may be the same as the test drive parameter being determined and/or varied but is in many embodiments a different parameter. The signal property may specifically be voltage, current, level and/or power measurement (such as e.g. an amplitude or average level).

In accordance with an optional feature of the invention, the adapter is arranged to determine the test drive signal parameter value in response to a rate of change of the signal property.

This may provide particularly advantageous operation and foreign object detection in many embodiments.

In accordance with an optional feature of the invention, the adapter is arranged to determine the test drive signal parameter value in response to a value of the test drive parameter when detecting a change in the rate of change of the signal property.

This may provide particularly advantageous operation and foreign object detection in many embodiments.

In accordance with an optional feature of the invention, the signal property of the test drive signal is a current or voltage of the test drive signal and the test drive signal parameter value is a frequency of the test drive signal.

This may provide particularly advantageous operation and foreign object detection in many embodiments. The signal property may specifically be a current or voltage of the test drive signal.

In accordance with an optional feature of the invention, the test generator comprises a full bridge switch output circuit arranged to generate the test drive signal, and the test generator is arranged to change an operating mode for the full bridge switch output circuit from a full bridge operational mode during a power transfer time interval to a half bridge operational mode during a foreign object detection time interval.

This may provide improved performance in many embodiments.

In many embodiments, the test generator may be arranged to gradually change the operating mode from the full bridge operational mode to a half bridge operation mode. This may for example be performed by a gradual change in a duty cycle of a switch signal controlling one or more switches of the full bridge switch output circuit.

In accordance with an optional feature of the invention, the adapter is arranged to determine the test drive signal parameter value in response to a value of a property of the varying test drive signal for which it is detected that circuitry of the power receiver begins to extract power from the test drive signal.

This may provide a particularly efficient approach in many embodiments.

In accordance with an optional feature of the invention, a single coil forms both the transmitter coil and the test coil.

This may allow a lower complexity power transmitter in many embodiments.

In many embodiments, the test coil and the transmitter coil may be the same coil. In many embodiments, the driver and the test generator may be the same entity, thus the same circuitry may generate both the drive signal and the test drive signal. In many embodiments, the power transfer signal and the test drive signal may share many parameter values, for example they may have the same frequency.

In accordance with an optional feature of the invention, test drive generator is arranged to gradually change a signal property of the test drive signal from an initial value to the test drive signal parameter value during an initial time interval of a foreign object detection time interval, the initial time interval having a duration of no less than 20 msec.

This may provide improved performance in many embodiments.

According to an aspect of the invention there is provided a wireless power transfer system comprising a power receiver and a power transmitter for wirelessly providing power to the power receiver via an inductive power transfer signal; the power transmitter comprising: a transmitter coil for generating the power transfer signal; a driver for generating a drive signal for the transmitter coil, the driver being arranged to, during a power transfer phase, generate the drive signal to generate the power transfer signal during power transfer time intervals of a repeating time frame comprising at least one power transfer time interval and one foreign object detection time interval; a test coil for generating an electromagnetic test signal; a test generator arranged to generate a test drive signal for the test coil to generate the electromagnetic test signal during foreign object detection time intervals of the repeating time frame; a foreign object detector arranged to perform a foreign object detection test in response to a measured parameter for the test drive signal during the foreign object detection time intervals; an adapter arranged to control the test generator to generate a varying test drive signal for the test coil during an adaptation time interval by varying at least one of a frequency, voltage, current, duty cycle, signal level, and amplitude of the test drive signal, and to determine a test drive signal parameter value in response to the varying test drive signal and a message received from the power receiver, the test drive parameter value being a value of at least one of a frequency, voltage, current, duty cycle, signal level, and amplitude, and to determine a test drive signal parameter value in response to the varying test drive signal and a message received from the power receiver; a memory for storing the test drive signal parameter value; and wherein the test generator is arranged to set a signal property of the test drive signal during at least one foreign object detection time interval in response to the test drive signal parameter value; and the power receiver comprising: a power receiving coil for extracting power from the power transfer signal, a message transmitter for transmitting the message to the power transmitter in response to a detection of an operational criterion being met during the adaptation time interval.

In accordance with an optional feature of the invention, the operational criterion comprises a requirement that a circuit of the power receiver begins to extract power from the power transfer signal.

According to an aspect of the invention there is provided a method for a power transmitter for wirelessly providing power to a power receiver via an inductive power transfer signal; the power transmitter comprising a transmitter coil for generating the power transfer signal and a test coil for generating an electromagnetic test signal; the method comprising: generating, during a power transfer phase, a drive signal for the transmitter coil to generate the power transfer signal during power transfer time intervals of a repeating time frame comprising at least one power transfer time interval and one foreign object detection time interval; generating a test drive signal for the test coil to generate the electromagnetic test signal during foreign object detection time intervals of the repeating time frame; performing a foreign object detection test in response to a measured parameter for the test drive signal during the foreign object detection time intervals; controlling the test generator to generate a varying test drive signal for the test coil during an adaptation time interval by varying at least one of a frequency, voltage, current, duty cycle, signal level, and amplitude of the test drive signal, determining a test drive signal parameter value in response to the varying test drive signal, the test drive parameter value being a value of at least one of a frequency, voltage, current, duty cycle, signal level, and amplitude; storing the test drive signal parameter value; and during at least one foreign object detection time interval retrieving the test drive signal parameter value and setting a signal property of the test drive signal in response to the test drive signal parameter value.

According to an aspect of the invention there is provided a method for a wireless power transfer system comprising a power receiver and a power transmitter for wirelessly providing power to the power receiver via an inductive power transfer signal; the power transmitter comprising a transmitter coil for generating the power transfer signal and a test coil for generating an electromagnetic test signal; the method comprising the power transmitter performing the steps of: generating, during a power transfer phase, a drive signal for the transmitter coil to generate the power transfer signal during power transfer time intervals of a repeating time frame comprising at least one power transfer time interval and one foreign object detection time interval; generating a test drive signal for the test coil to generate the electromagnetic test signal during foreign object detection time intervals of the repeating time frame; performing a foreign object detection test in response to a measured parameter for the test drive signal during the foreign object detection time intervals; controlling the test generator to generate a varying test drive signal for the test coil during an adaptation time interval by varying at least one of a frequency, voltage, current, duty cycle, signal level, and amplitude of the test drive signal, determining a test drive signal parameter value in response to the varying test drive signal, the test drive parameter value being a value of at least one of a frequency, voltage, current, duty cycle, signal level, and amplitude; storing the test drive signal parameter value; and during at least one foreign object detection time interval retrieving the test drive signal parameter value and setting a signal property of the test drive signal in response to the test drive signal parameter value; and the power receiver performing the step of transmitting the message to the power transmitter in response to a detection of an operational criterion being met during the adaptation time interval.

These and other aspects, features and advantages of the invention will be apparent from and elucidated with reference to the embodiment(s) described hereinafter.

BRIEF DESCRIPTION OF THE DRAWINGS

Embodiments will be described, by way of example only, with reference to the drawings, in which.

DETAILED DESCRIPTION

The following description focuses on embodiments applicable to a wireless power transfer system utilizing a power transfer approach such as known from the Qi specification. However, it will be appreciated that the invention is not limited to this application but may be applied to many other wireless power transfer systems.

Figure 1:
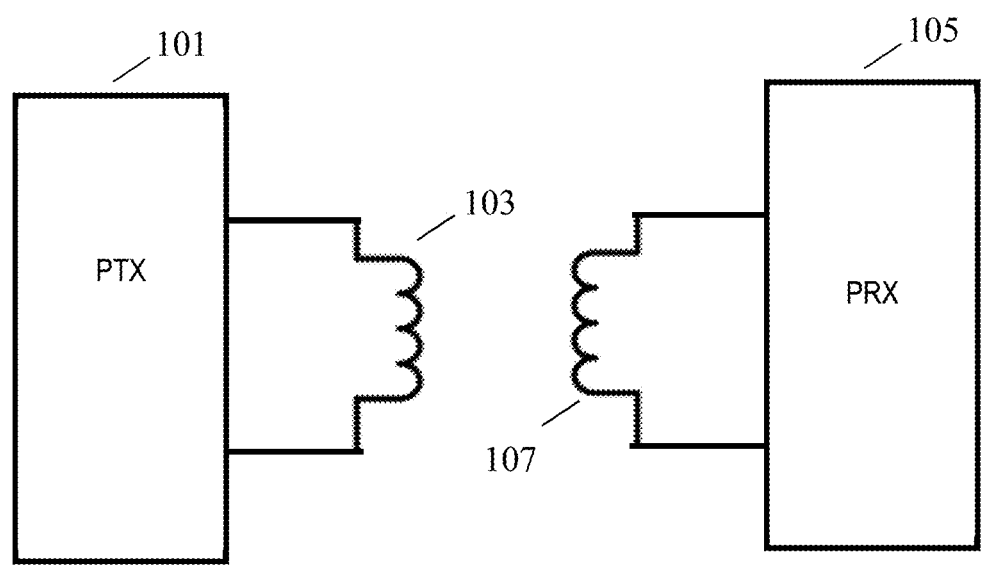
FIG. 1 illustrates an example of elements of a power transfer system in accordance with some embodiments.

FIG. 1 illustrates an example of a power transfer system in accordance with some embodiments. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In wireless power transfer systems, the presence of an object (typically a conductive element extracting power from the power transfer signal and not being part of the power transmitter 101 or the power receiver 105, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object.

In order to address such scenarios, wireless power transfer systems such as Qi include functionality for foreign object detection. Specifically, the power transmitter comprises functionality seeking to detect whether a foreign object is present. If so, the power transmitter may e.g. terminate the power transfer or reduce the maximum amount of power that can be transferred.

Current approaches proposed by the Qi Specifications are based on detecting a power loss (by comparing the transmitted and the reported received power) or detecting degradations in the quality Q of the output resonance circuit. However, in current use these approaches have been found to provide suboptimal performance in many scenarios, and they may specifically lead to inaccurate detection resulting in missed detections and/or false positives where a foreign object is detected despite no such object being present.

Foreign object detection may be performed before a power receiver enters the power transfer phase (e.g. during the initialization of the power transfer) or during the power transfer phase. Detection during the power transfer phase is often based on comparisons of measured transmitted power and received power whereas detection that take place before the power transfer phase is often based on measurements of a reflected impedance, e.g. by measuring the quality factor of the transmitter coil by using a small measurement signal.

Conventional foreign object detection tends to be suboptimal, partly due to variations and uncertainties in the specific operating conditions and scenarios in which the foreign object detection is performed, including variations and uncertainties in the power transmitter properties, power receiver properties, test conditions applied etc.

An example of the challenges to foreign object detection tests is the requirement to perform sufficiently accurate measurements in order to achieve a sufficiently reliable foreign object detection. This may lead to a desire to generate as powerful a signal as possible in order to increase the detection accuracy. However, this may increase power consumption in the power receiver and in any foreign object present. The detection performance may be sensitive to the specific signal level applied and there will typically be conflicting requirements.

The system of FIG. 1 uses an approach for foreign object detection that seeks to adapt operation to provide improved trade-offs for foreign object detection. The approach may in many embodiments provide improved foreign object detection and specifically may in many embodiments provide a more accurate and/or reliable foreign object detection. The approach may further allow low complexity and low resource requirements. An advantage of the approach is that it may be suitable for inclusion in many existing systems, such as specifically in a Qi wireless power transfer system, and indeed that this may often be achieved with few modifications.

As will be described in more detail in the following, the approach utilizes a time division approach during the power transfer phase wherein foreign object detection and power transfer may e.g. be performed in separate time intervals thereby allowing the interference between these (specifically the impact of the power transfer on the foreign object detection) to be reduced substantially. Furthermore, parameters of the generated electromagnetic signal may be adapted to the specific test scenario. This can be achieved through an adaptation process which e.g. may be performed prior to the system entering the power transfer phase.

In the following, the system of FIG. 1 will be described in more detail. In the example, the electromagnetic power transfer signal and the electromagnetic test signal used for the foreign object detection are generated by two different coils (driven by different drivers). Further, the signals will be referred to by different terms, namely the electromagnetic signal generated during power transfer time intervals will be referred to as the power transfer signal and the electromagnetic signal generated during foreign object detection time intervals will be referred to as the electromagnetic test signal, or just the test signal. However, it will be appreciated that in many embodiments, the electromagnetic signal may be generated from the same coil in both the power transfer time interval and the foreign object detection time interval, and indeed the same driver etc. may be used for both the power transfer time interval and the foreign object detection time interval. Indeed, the references to the test signal may in many embodiments be considered equivalent to the power transfer signal during the foreign object detection time interval.

Figure 2:
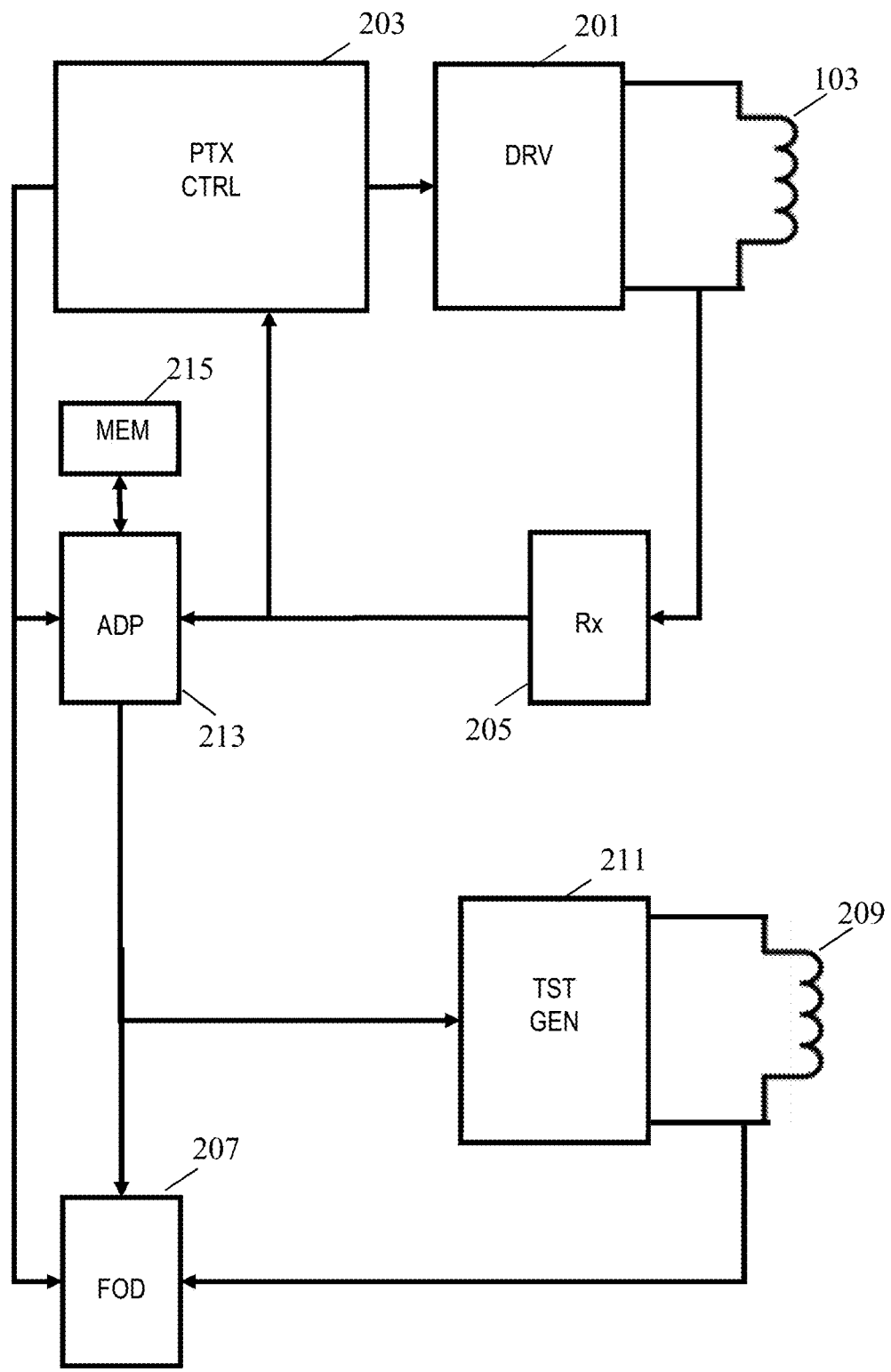
FIG. 2 illustrates an example of elements of a power transmitter in accordance with some embodiments.

FIG. 2 illustrates elements of the power transmitter 101 of FIG. 1 in more detail.

The power transmitter 101 includes a driver 201 which can generate a (power transfer) drive signal that is fed to the transmitter coil 103 which in return generates the electromagnetic power transfer signal thereby providing a power transfer to the power receiver 105. The power transfer signal is provided during power transfer time intervals of the power transfer phase.

The driver 201 may typically comprise an output circuit in the form of an inverter, typically formed by driving a full or half bridge as will be well known to the skilled person.

Figure 3:
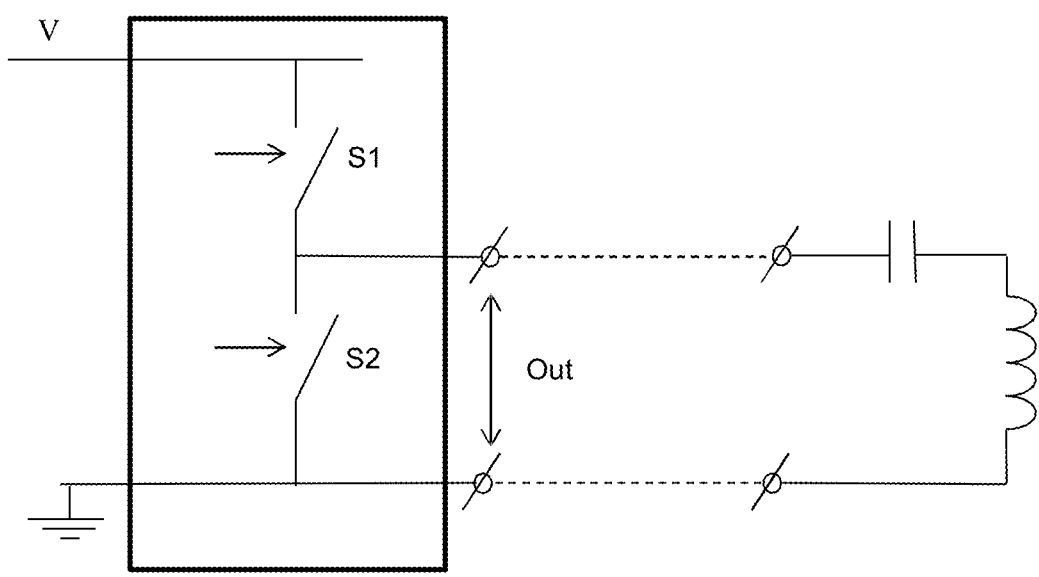
FIG. 3 illustrates an example of a half bridge inverter for a power transmitter.
Figure 4:
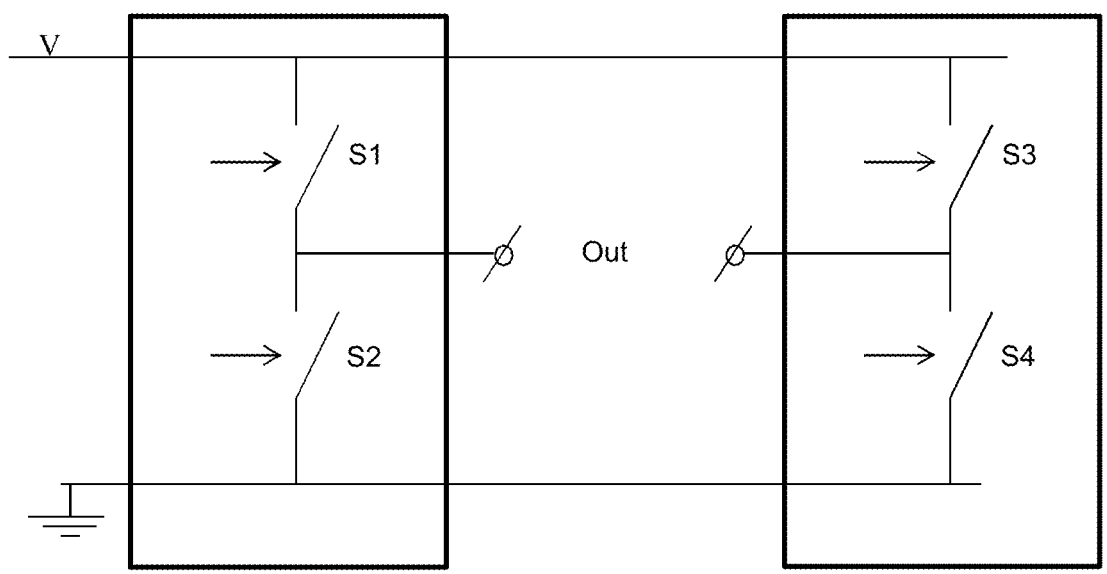
FIG. 4 illustrates an example of a full bridge inverter for a power transmitter.

The driver 201 generates the current and voltage which is fed to the transmitter inductor 103. The driver 201 is typically a drive circuit in the form of an inverter which generates an alternating signal from a DC Voltage. The output of the driver 203 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 are open, thereby creating a square-wave signal at the output. The switches are opened and closed with the desired frequency.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications.

The power transmitter controller 203 is in particular arranged to control the generation of the drive signal by the driver 201, and it can specifically control the power level of the drive signal, and accordingly the level of the generated power transfer signal. The power transmitter controller 203 comprises a power loop controller controlling a power level of the power transfer signal in response to the power control messages received from the power receiver 105 during the power control phase.

In order to receive data and messages from the power receiver 105, the power transmitter 101 comprises a message receiver 205 which is arranged to receive data and messages from the power receiver 105 (as will be appreciated by the skilled person, a data message may provide one or more bits of information). In the example, the power receiver 105 is arranged to load modulate the power transfer signal generated by the transmitter coil 103, and the message receiver 205 is arranged to sense variations in the voltage and/or current of the transmitter coil 103 and to demodulate the load modulation based on these. The skilled person will be aware of the principles of load modulation, as e.g. used in Qi wireless power transfer systems, and therefore these will not be described in further detail.

In some embodiments, communication may be performed using a separate communication channel which may be achieved using a separate communication coil, or indeed using the transmitter coil 103. For example, in some embodiments Near Field Communication may be implemented or a high frequency carrier (e.g. with a carrier frequency of 13.56 MHz) may be overlaid on the power transfer signal.

The power transmitter 101 further comprises a foreign object detector 207 which is arranged to perform foreign object detection tests, i.e. to specifically detect whether any undesired conductive elements are likely to be present within the generated electromagnetic field.

In the system, the foreign object detection tests are based on measurements performed during foreign object detection time intervals. During these foreign object detection time intervals, the power transmitter 101 proceeds to operate in a foreign object detection mode in which an operating condition is set up for the purpose of evaluating whether any foreign objects are present or not.

For example, for embodiments wherein the power transmitter 101 uses different coils for generating the power transfer signal and the electromagnetic test signal, the power transmitter 101 may switch the power transfer signal off completely and set the electromagnetic test signal to a suitable value. In embodiments where the same coil is used to generate the power transfer signal and the electromagnetic test signal, the drive signal for the coil may be changed from an operating point suitable for power transfer to an operating point suitable for foreign object detection. Thus, in many embodiments, a current, voltage, frequency, duty cycle, power or level of the drive signal and thus the power transfer signal and/or the electromagnetic test signal is changed between a power transfer time interval and a foreign object detection time interval. In many embodiments, the power or level of the power transfer signal may be changed from a power level determined by a power transfer control loop function to a power level not determined by (independent of) the power transfer control loop function, such as a previously determined value. In many embodiments, the power or level of the electromagnetic signal may be changed from a first power level to a second power level. The first power level may be a predetermined or nominal level (and specifically may be zero) or may e.g. be determined by the power transfer power control loop. The second power level may be a previously determined level and may be independent of the power transfer power control loop.

During an interval in which foreign object detection is performed, i.e. during a foreign object detection time interval, the foreign object detector 207 thus evaluates conditions to determine whether a foreign object is considered present or not. During the foreign object detection time interval, the power transmitter 101 generates an electromagnetic test signal and the foreign object detection is based on evaluating characteristics and properties of this signal.

For example, the power level of the test drive signal may reflect the power extracted from the generated electromagnetic test signal and this may be used as an indication of the power being extracted by potential foreign objects (typically by comparing it to the expected power extraction from the power receiver 105). The power level of the electromagnetic test signal reflects the power that is extracted from the electromagnetic test signal by conductive elements (including the receiver coil 107) in the electromagnetic field. It thus indicates the power extracted by the combination of the power receiver 105 as well as any foreign objects that may be present. The difference between the power level of the electromagnetic signal and the power extracted by the power receiver 105 accordingly reflects the power extracted by any foreign objects present. The foreign object detection may for example be a low complexity detection. For example, a detection of a foreign object may be considered to have occurred if the difference between the power level of the electromagnetic signal (henceforth referred to as transmit power level) exceeds the reported power extracted by the power receiver 105 (henceforth referred to as received power level).

In the approach, the foreign object detection is accordingly based on a power level comparison between a transmitted power level and a reported received power level. The reaction to a detection of a foreign object may be different in different embodiments. However, in many embodiments, the power transmitter 101 may be arranged to terminate a power transfer (at least temporarily) in response to a detection of a foreign object.

In order to generate the test signal, the power transmitter 101 comprises a test coil 209 which is coupled to a test generator 211. The test generator 211 is arranged to generate a test drive signal for the test coil 209 to provide the electromagnetic test signal during the foreign object detection time interval. The test drive signal is an electrical signal fed to the test coil 209 resulting in the electromagnetic test signal being generated, i.e. the test coil 209 generates a corresponding electromagnetic field with a field strength depending on the test drive signal.

The test generator 211 may comprise substantially the same functionality as the driver 201, e.g. the output of the test generator 211 may be a half or full bridge inverter. Indeed, as previously mentioned, in many embodiments, the test generator 211 may be implemented by the driver 201 and the test coil 209 may be implemented by the transmitter coil 103. Accordingly, in the following, all references to test generator 211 and the test coil 209 may as appropriate be considered as references to the driver 201 and the test coil 209 for embodiments where the same coil is used for the generation of both the power transfer signal and the electromagnetic test signal.

The power transmitter further comprises an adapter 213 which is arranged to determine a suitable value for one or more parameters of the test drive signal. This test drive signal parameter value is then applied during (at least one) foreign object detection time intervals of the power transfer phase. The adapter 213 operation will be described in more detail later.

Figure 5:
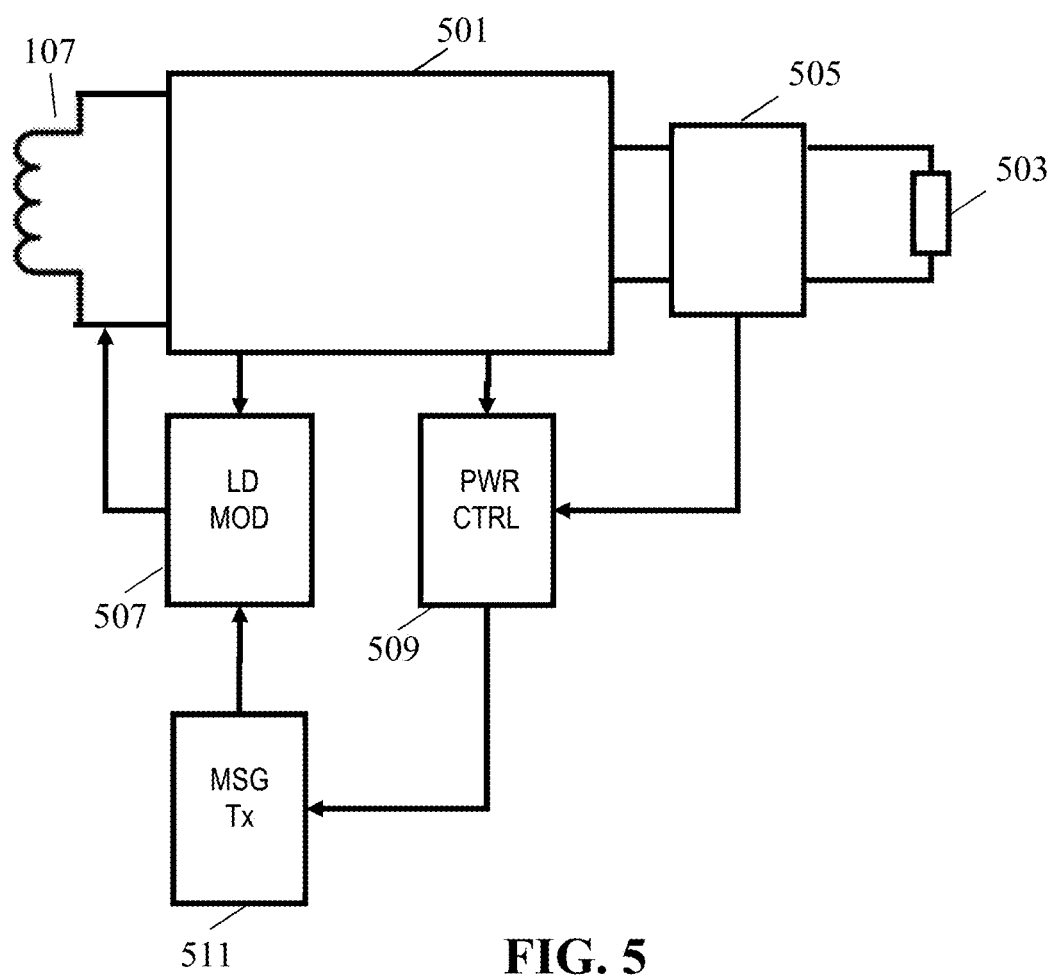
FIG. 5 illustrates an example of elements of a power receiver in accordance with some embodiments.

FIG. 5 illustrates some exemplary elements of the power receiver 105 of FIG. 1.

The receiver coil 107 is coupled to a power receiver controller 501 which couples the receiver coil 107 to a load 503 via a load output circuit 505. The power receiver controller 501 and load output circuit 505 include a power control path which convert the power extracted by the receiver coil 107 into a suitable supply for the load 503. In addition, the power receiver controller 501 may include various power receiver controller functionality required to perform power transfer, and in particular functions required to perform power transfer in accordance with the Qi specifications.

In order to support communication from the power receiver 105 to the power transmitter 101 the power receiver 105 comprises a load modulator 507. The load modulator 507 is arranged to vary the loading of the receiver coil 107 in response to data to be transmitted to the power transmitter

101. The load variations are then detected and demodulated by the power transmitter 101 as will be known to the person skilled in the art.

The power receiver 105 further comprises a message controller 511 arranged to generate suitable messages and control the load modulator such that the power transfer signal is modulated according to the message thereby allowing the power transmitter 101 to detect the transmitted message.

Figure 6:
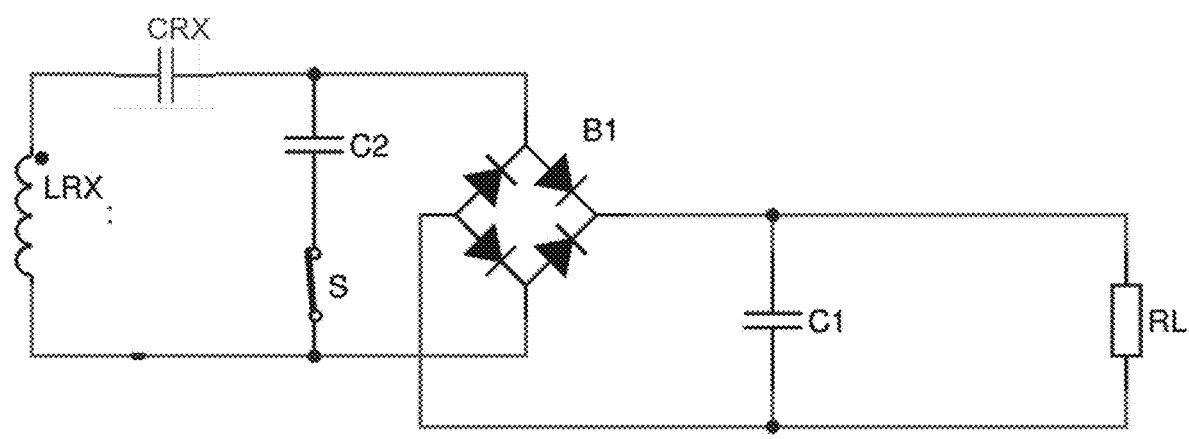
FIG. 6 illustrates an example of elements of a power receiver in accordance with some embodiments.

FIG. 6 illustrates a circuit diagram of elements of an example of a power path of the power receiver 105. In the example, the power receiver 105 comprises the receiver coil 107 referred to by the designation LRX. In the example, receiver coil 107 is part of a resonance circuit and the power receiver 105 accordingly also includes a resonance capacitor CRX. The receiver coil 107 is subjected to the electromagnetic signal and accordingly an AC voltage/current is induced in the coil. The resonance circuit is coupled to a rectifier bridge with a smoothing capacitor C1 coupled to the output of the bridge. Thus, a DC voltage is generated over the capacitor C1. The magnitude of the ripple on the DC voltage will depend on the size of the smoothing capacitor as well as on the load.

The bridge B1 and smoothing capacitor C1 are coupled to the load 503 which is indicated by reference sign RL. It will also be appreciated that the load 503 is illustrated as a simple passive port but that it may of course be any suitable load. For example, the load 503 may be a battery to be charged, a mobile phone, or another communication or computational device, may be a simple passive load etc. Indeed, the load 503 need not be an external or dedicated internal load but may for example include elements of the power receiver 105 itself. Thus, the load 503 illustrated in FIGS. 5 and 6 may be considered to represent any load of the receiver coil 107/the electromagnetic signal.

FIG. 6 further illustrates a load modulation capacitor C2 which can be connected or disconnected in parallel to the resonance circuit based on the switching of switch S. The load modulator 507/the message controller 511 may be arranged to control the switch S such that the load of the modulation capacitor C2 can be connected and disconnected in response to data to be transmitted to the power transmitter 101 thereby providing load modulation.

The power receiver 105 includes a power controller 509 which is arranged to establish a power control loop with the power transmitter 101. Specifically, the power controller 509 can transmit power control messages to the power transmitter 101 and in response the power transmitter 101 may change the power level of the power transfer signal during the power transfer time intervals. Typically, the power controller 509 may generate power control error messages which indicate a request for the power transmitter 101 to increase or decrease the power level. The power controller 509 may determine the appropriate error messages by comparing a measured value to a reference value. During power transfer, the power controller 509 may compare the provided power level with the required power level and request an increased or decreased power level based on this comparison.

Figure 7:
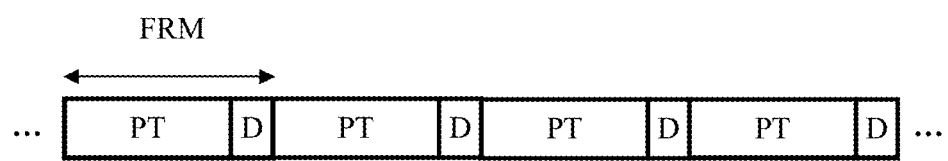
FIG. 7 illustrates an example of a time frame for the wireless power transfer system of FIG. 1.

As previously mentioned, the system applies a repeating time frame during the power transfer phase where the time frame comprises at least one power transfer time interval and one foreign object detection time interval. An example of such a repeating time frame is illustrated in FIG. 7 where power transfer time intervals are indicated by PT and foreign object detection time intervals are indicated by D. In the example, each time frame FRM comprises only one foreign object detection time interval and one power transfer time interval and these (as well as the time frame itself) have the same duration in each frame. However, it will be appreciated that in other embodiments, other time intervals may also be included in a time frame (such as e.g. communication intervals) or a plurality of foreign object detection time intervals and/or power transfer time intervals may be included in each time frame. In particular, some time frames may include an adaptation time interval as will be described in more detail later (or in some time frames the foreign object detection time interval may be replaced by an adaptation time interval). Furthermore, the duration of the different time intervals (and indeed the time frame itself) may in some embodiments vary dynamically.

In the approach, the foreign object detection and the power transfer is thus separated in the time domain thereby resulting in reduced cross-interference from the power transfer to the foreign object detection. Thus, the variability and uncertainty resulting from variations in the operating conditions for the power transfer can be isolated from the foreign object detection resulting in a more reliable and accurate foreign object detection.

In the power transfer signal time interval, the power transmitter is thus arranged to perform power transfer during the power transfer time interval of the time frames of the power transfer phase. Specifically, during these time intervals, the power transmitter 101 and the power receiver 105 may operate a power control loop (the power control loop may be based on communication within the power transfer signal time interval or may e.g. be based on communication outside of the power transfer signal time interval, such as in dedicated communication time intervals. For example, each foreign object time interval may be separated by a plurality of alternating power transfer signal time intervals and communication time intervals). Thus, the level of the power being transferred may be dynamically varied. In the foreign object detection time intervals of the time frames of the power transfer phase, at least one parameter of the drive signal, and thus of the electromagnetic test signal, is set to a value determined during an adaptation operation performed prior to the foreign object detection time interval. Thus, in the foreign object detection time interval, the parameter may be set to a predetermined value (i.e. being determined prior to the foreign object detection time interval, and often prior to the power transfer phase). In contrast, the parameter may not be constrained to this predetermined value during power transfer time intervals.

For example, during a power transfer time interval, the system may operate a power control loop which allows the power level of the power transfer signal to be varied in response to power control messages from the power receiver. The power control loop may control/vary at least one of a current, voltage, and frequency of the drive signal/power transfer signal. In contrast, during a foreign object detection time interval, the parameter varied by the power control loop during the power transfer time interval may be set to a predetermined value determined prior to the power transfer phase.

In many embodiments where the same coil is used for both the power transfer signal and the electromagnetic test signal, the power transmitter may be arranged to reduce the level of the power transfer signal during the foreign object detection time interval relative to the power transfer time interval. In many situations, the power level of the power transfer signal may be allowed to increase to high levels, such as e.g. to levels of 10-100 W, or even substantially higher in many applications (e.g. for power transfer to kitchen appliances). However, during a foreign object detection time interval, the power level of the generated electromagnetic signal may be reduced to a predetermined level that is much lower than the current or maximum allowable power during the power transfer time interval. For example, the power level may be set to a predetermined level not exceeding 1 W. In other words, the power of the electromagnetic test signal during the foreign object detection time interval may be constrained to a power level that is substantially (e.g. by a factor of no less than 2, 5, or 10) lower than a maximum allowed power level of the power transfer signal during the power transfer time interval.

In addition to applying the time frame comprising specific foreign object detection time intervals, the system also applies an approach wherein the value of one or more parameters (or properties) of the generated electromagnetic test signal is adapted based on an adaptation process which in many embodiments may be performed prior to the power transfer phase. This adaptation process thus determines a preferred value for one or more of the parameters/properties of the electromagnetic test signal prior to the power transfer phase and then applies this preferred value during the foreign object detection time intervals of the subsequent power transfer phase. In some embodiments, the adaptation process may be repeated, e.g. at regular intervals, during the power transfer phase.

The power transmitter 101 specifically comprises an adapter 213 which is arranged to determine a test drive signal parameter value during an adaptation time interval which may be performed during the power transfer phase but is often additionally or alternatively performed prior to the power transfer phase. For example, in many embodiments, the power transfer initialization phase may include an adaptation time interval, and the test drive signal parameter value determined in this pre-power transfer phase adaptation time interval may then be used throughout the power transfer phase. In other embodiments, adaptation time intervals may alternatively or additionally be implemented during the power transfer phase, e.g. by replacing a foreign object detection time interval, with the newly determined test drive signal parameter value then being used for subsequent foreign object detection time intervals.

Thus, in addition to the foreign object detection time intervals and the power transfer time intervals, the system also employs one or more adaptation time intervals. The system includes at least three different operational modes being performed in different time intervals. During power transfer, a repeating time frame is employed comprising at least one power transfer time interval in which power transfer from the power transmitter to the power receiver is performed, and one foreign object detection time interval in which foreign object detection is performed. In addition, one or more adaptation time intervals are employed in which an adaptation operation is performed in order to determine a value of a parameter of the test drive signal which is to be used in (at least one) subsequent foreign object detection time intervals. The adaptation time interval may in some embodiments be included in one or more of the repeating time frames. Alternatively or additionally, the adaptation time interval may precede the power transfer and may e.g. be performed as part of the power transfer initialization phase.

Thus, different operations are performed in the different time intervals. The power transfer time intervals and foreign object detection time intervals are repeated and often alternated in order to achieve a power transfer operation where power transfer is typically periodically repeated in order to perform accurate foreign object detection. In addition, the system may in a separate adaptation time interval perform a dedicated adaptation operation in which subsequent foreign object detection tests are adapted/calibrated. This adaptation/calibration is performed by determining a value for a parameter of the test drive signal, and specifically by determining a value for the frequency, voltage, current, duty cycle, signal level, and/or amplitude of the test drive signal to be used.

In many embodiments, the adaptation time interval is non-overlapping with the foreign object detection time interval and the power transfer time interval. It is possible in some embodiments to perform the adaptation at the same time as performing foreign object detection. For example, as will be described in the following, the adaptation is based on generating a varying test drive signal and determining the value of the test drive signal parameter based on this variation. In some embodiments, foreign object detection may also be performed during this variation, e.g. if the power extraction exceeds a given level, then it may be considered that a foreign object may have been detected.

However, in most embodiments, the adaptation time interval will be disjoint/non-overlapping with both the foreign object detection time interval and the power transfer time interval. In many embodiments, the adaptation time interval may be included as part of the power transfer initialization and may be performed under the assumption that no foreign object is present (e.g. after a user has manually confirmed that no foreign objects are present). Also, even if an adaptation time interval is executed during the power transfer phase, it may be separate and non-overlapping with the foreign object detection time interval and the power transfer time interval. For example, some time frames may in addition to one (or more) foreign object detection time intervals and one or more power transfer intervals also include an adaptation time interval.

Thus, in most embodiments, the adaptation time interval is disjoint with/non-overlapping with/separate to the foreign object detection time interval, and specifically the adaptation is performed in an adaptation time interval during which normal power transfer and/or foreign object detection is not performed.

During the adaptation time interval, the adapter 213 is arranged to control the test generator 211 to generate a varying test drive signal. Thus, the adapter 213 can control the test generator 211 resulting in this varying a signal property of the test drive signal, such as e.g. varying the current (amplitude), voltage (amplitude), frequency, duty cycle, and/or level of the test drive signal.

The adapter 213 may then monitor the result of this variation of the test drive signal and may determine a suitable test drive signal parameter value based on a determined reaction to the varying test drive signal. Specifically, the adapter 213 may be arranged to detect that a specific condition or event occurs and may then determine the test drive signal parameter value dependent on a property of the varying test drive signal when the specific event is detected.

For example, the adapter 213 may vary the level (e.g. current or voltage amplitude) of the test drive signal, and thus of the electromagnetic test signal, and may detect when the power receiver indicates that the test signal is too high, for example by transmitting a message. The level of the test drive signal for subsequent foreign object detection time intervals may then be set based on the level of the test drive signal when the power receiver indicates that it is (just) too high. For example, the level of the test drive signal may be set to be, say, 10% below the level of the test drive signal when the power receiver indicated that it was too high.

As another example, the adapter 213 may vary the frequency of the test drive signal and may continuously monitor the current provided to the test coil during the adaptation time interval. In many embodiments, the test coil may be part of a resonance circuit and as the frequency approaches the resonance frequency, the current will increase. The frequency for which the current reaches a predetermined threshold may be detected, and the frequency of the test drive signal when this occurs may be determined, and then used for the test drive signal during subsequent foreign object detection time intervals.

As yet another example, the adapter 213 may vary the duty cycle of the test drive signal. A duty cycle close to 50% may generate the strongest induced signal in the power receiver whereas a duty cycle close 0% (or close to 100%) may generate a smaller induced signal. Thus, the duty cycle may gradually be changed from e.g. 0% (or 100%) towards 50% resulting in a gradually increased level of the induced signal. The duty cycle for which e.g. a measured power or current is reached may be noted (or e.g. a duty cycle for which a message is received from the power receiver indicating that the induced signal has reached a desired level may be noted), and this duty cycle may then be used for subsequent foreign object detection time intervals. It will be appreciated that in some embodiments the duty cycle may be considered the percentage of the time for which the test drive signal has a non-zero value. In other embodiments, the duty cycle may be considered as a percentage of time for which the test drive signal has a non-zero value and a given polarity.

Thus, in some embodiments, the adapter 213 may determine the test drive signal parameter value in response to a value of a property of the varying test drive signal when a condition or event is detected.

The adapter 213 is coupled to a memory 215 in which the adapter 213 is arranged to store the determined test drive signal parameter value. In subsequent foreign object detection time intervals, the adapter 213 may then retrieve the test drive signal parameter value and provide this to the test generator 211 (or the test generator 211 can directly retrieve it). The test generator 211 then sets a signal property of the test drive signal in response to the test drive signal parameter value. Typically, the test drive signal parameter value may directly be used by the test generator 211 as the desired signal property (e.g. the stored test drive signal parameter value may be a frequency, duty cycle, or level of the test drive signal to be used during the subsequent foreign object detection time intervals).

In many embodiments, the event or condition that is detected is that some circuitry of the power receiver begins to extract power from the test drive signal, and specifically that a battery or other energy reservoir of the power receiver or of the load begins to extract power.

For example, in many embodiments, the power being extracted from the electromagnetic test signal is minimal as long as the level of the electromagnetic test signal is sufficiently small. However, if the level increases above a given level, this will in many embodiments result in the power receiver beginning to extract power from the electromagnetic test signal.

Figure 8:
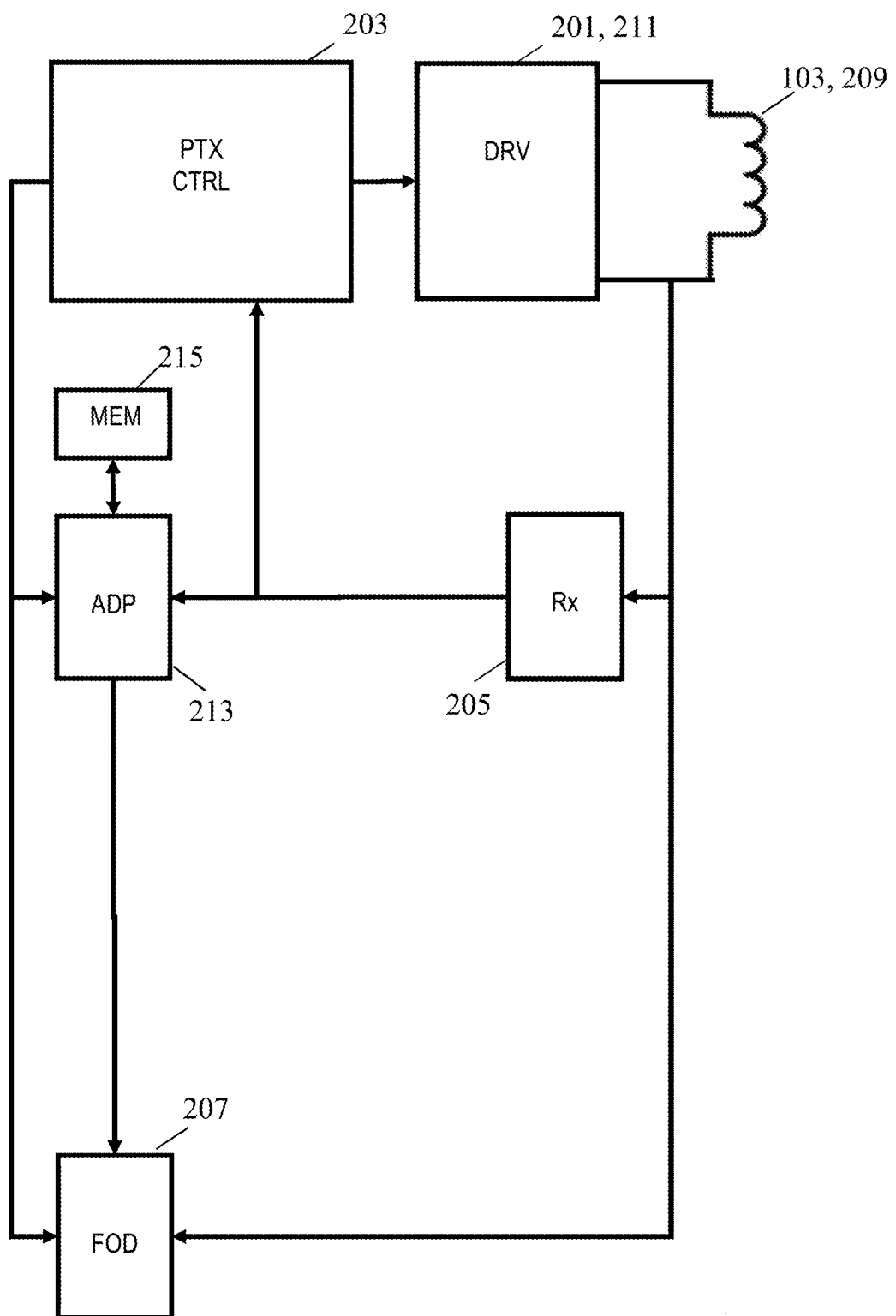
FIG. 8 illustrates an example of elements of a power transmitter in accordance with some embodiments.

The approach may in particular be suitable and advantageous for embodiments wherein the electromagnetic test signal and the power transfer signal are the same signal in the sense that they are generated by the same driver and coil, or output resonance circuit (and therefore tends to have frequencies in the same frequency band). The following description will focus on such embodiments and therefore references to the power transfer signal, the driver 201, and the transmitter coil 103 are equivalent to references to respectively the electromagnetic test signal, the test generator 211, the test coil 209, and vice versa. Thus, the following description will for clarity and brevity be directed to an embodiment wherein the driver 201 also implements the test generator 211, the transmitter coil 103 implements the test coil 209, and the generated power transfer signal and the electromagnetic test signal can be considered to be the same signal with changed parameters (in different time intervals). The following description will accordingly tend to refer to the power transfer signal, the driver 201, and the transmitter coil 103 but it will be appreciated that these references can be replaced by references to the test generator 211, the test coil 209, and the electromagnetic test signal as appropriate. FIG. 8 illustrates the power transmitter of FIG. 1 in accordance with the specific exemplary approach.

Figure 9:
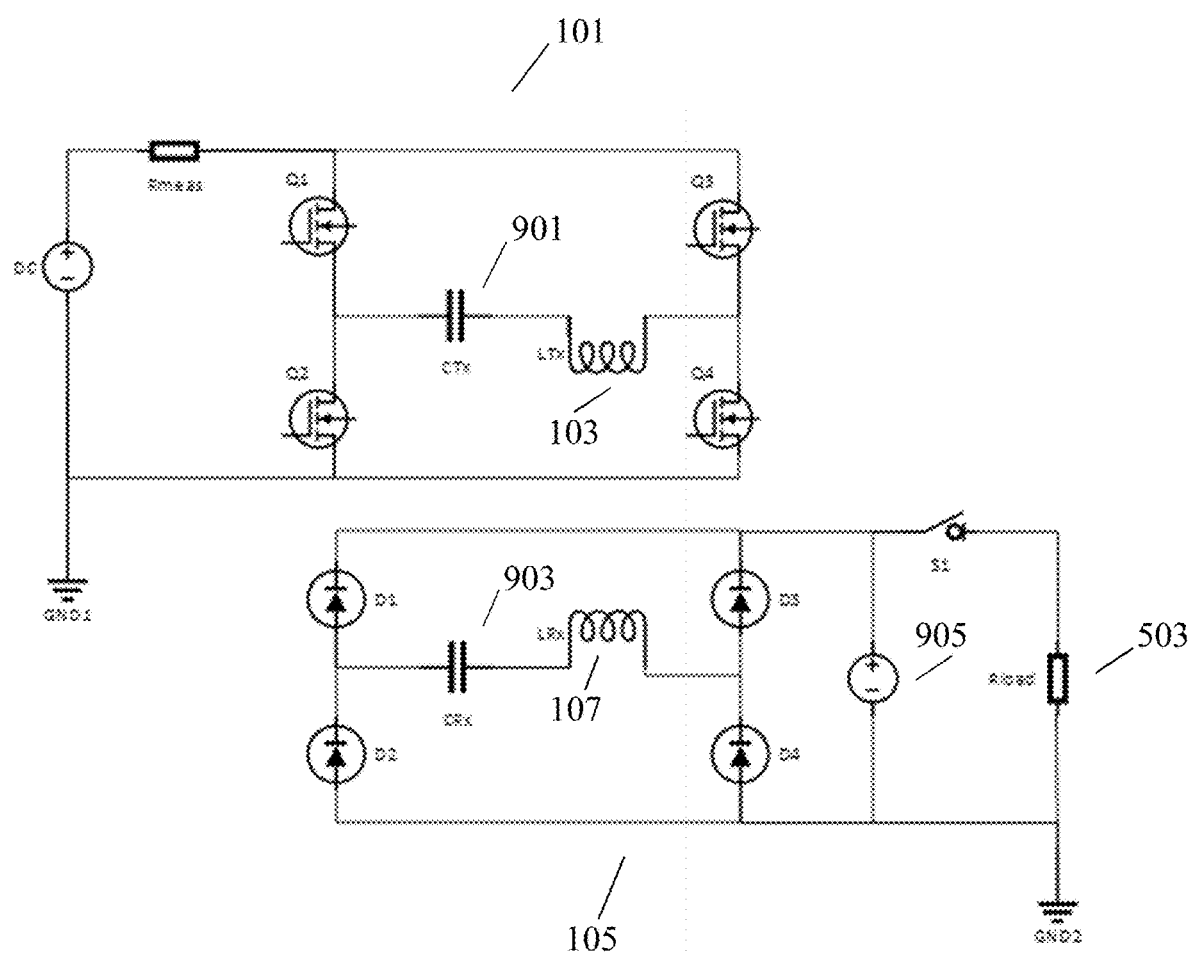
FIG. 9 illustrates an example of elements of a power transmitter and power receiver in accordance with some embodiments.

The specific example will be described with further reference to FIG. 9 which illustrates a principle schematic of the power transfer path of the power transmitter 101 and the power receiver 105. In the example, the transmitter coil 103 forms a resonance circuit together with a receive resonance capacitor 901 and similarly the receive coil 107 forms a resonance circuit together with a receive resonance capacitor 903. This may allow a more efficient power transfer in many embodiments as will be known to the skilled person. It may also allow the power transfer signal to be controlled by controlling the frequency of the drive signal.

In the example, the receive resonance circuit is coupled to the rest of the power receiver via a rectifier bridge (D1-D4) which rectifies the induced current/voltage of the receive coil 107. Further, a capacitor or battery 905 (or other suitable energy reservoir) is coupled across the rectifier bridge to smooth the rectified current/voltage as is well known in the art. In the example, the load 503 is illustrated to be coupled directly across the battery 905. In the example, the load 503 may accordingly be considered to represent the total load being powered by the power transfer signal, including both the main load 503 as well as any other (e.g. control) circuitry of the power receiver which is powered from the power transfer signal.

In order to perform as accurate a foreign object detection as possible, it is desirable to minimize the effect of the loading of the power transfer signal by the power receiver during the foreign object detection. This reduces the overall loading of the power transfer signal thereby making any loading of the power transfer signal by a foreign object easier to detect (e.g. as the power extracted from the power transfer signal by the power receiver (including e.g. friendly metal) is reduced, any power extracted by a foreign object becomes easier to detect). Furthermore, it tends to reduce the variations of the operating condition during the foreign object detection time interval thereby making changes caused by the presence of a foreign object easier to detect.

In order to improve foreign object detection, an option is to disconnect the load 503 during the foreign object detection time interval. This could for example be implemented by including a load switch S1 in line with the load 503 and then opening the load switch at the beginning of a foreign object detection time interval and closing it at the end of the foreign object detection time interval. However, such an approach will require a very close synchronization of the switch to the foreign object detection time interval, and thus require that the power transmitter and power receiver are closely synchronized. However, this adds complexity and may be difficult to achieve in practice.

Further, the approach requires that all power receivers must be equipped with a load switch and corresponding control functionality thereby increasing cost and complexity (and potentially rendering the system less robust to e.g. rogue power receivers not being able to disconnect the load).

The approach may also reduce backwards compatibility as legacy power receivers may not have functionality for disconnecting a load during foreign object detection time intervals.

Furthermore, an active disconnection of the load may be undesirable as the absence of a load may result in a substantially increased voltage at the rectifier, and this could expose vulnerable electronic circuits to the high voltage thereby risking damage to this circuitry. This may in particular be the case if the synchronization between the power transmitter and power receiver is not ideal.

In accordance with some embodiments of the current approach, the load 503 may however be effectively disconnected from the power transfer signal (but not from the power receiver) by the power transfer signal during the foreign object detection time interval being controlled to a level which is so low that the induced voltage is not sufficient for any of the rectifiers to conduct.

For example, during a power transfer time interval, the power transfer signal may (by the power control loop) be controlled to transfer sufficient power for the battery to have an average voltage of, say, around 12V. During the foreign object detection time interval, the power transfer signal may be set to a much lower value resulting in the induced signal not exceeding a voltage of, say, 6V. Accordingly, as long as the foreign object detection time interval is sufficiently short to prevent the battery voltage to fall below this voltage, the rectifiers will never conduct and the load 503 (and indeed the battery) will effectively be disconnected from the power transfer signal. Thus, in this case the loading of the power transfer signal is limited to that of friendly metal thereby providing for a much more accurate foreign object detection.

However, whereas such an approach may provide improved performance in many scenarios (and e.g. allow the load 503 to be continuously connected to the battery 905 during the foreign object detection time interval), finding the optimum settings for the power transfer signal (and thus for the drive signal) is a challenging task in many scenarios. On one hand, it is desired for the level of the power transfer signal to be as low as possible in order to ensure that the rectifiers do not conduct and the load of the power transfer signal by the power receiver is minimized. However, at the same time, it is desired that the level is as high as possible in order to improve the probability of detection of a foreign object.

The issue is further exacerbated by the fact that the operating conditions tend to be unpredictable and vary between different scenarios and power receivers. For example, the point at which the battery starts to draw current may depend on the duration of the foreign object detection time interval (i.e. it may change during the foreign object detection time interval), on the loading of the power receiver, on the battery voltage etc.

In some embodiments, suitable settings for the test drive signal/the power transfer signal may be determined by the system during the adaptation time interval varying the power transfer signal and detecting a point at which a given circuit of the power receiver starts to draw current. For example, if the level of the drive signal for the transmitter coil 103 is increased from a very low value, the induced voltage at the receiver will not exceed the voltage over the battery 905 (e.g. the battery may have been pre-charged to a suitable level during a previous phase, or e.g. during a power transfer time interval in case the adaptation time interval is during the power transfer phase). However, as the signal level is increased, the induced signal will at some stage reach a level at which the rectifiers start to conduct and the battery draws current from the power transfer signal. This level may be detected (by the power receiver or the power transmitter, directly or indirectly as will be described later). The parameters of the test drive signal at this point may then be determined and a suitable parameter value to use for the test drive signal during subsequent foreign object detection time intervals can be determined. For example, the level may be reduced by, say, 50% relatively to the level for which it is detected that the battery 905 starts to draw current.

This approach may thus allow for an improved setting of suitable parameters for the test drive signal during the foreign object detection time interval such that the electromagnetic test signal may be as large as possible while still ensuring that the load 503 is effectively decoupled from the power transfer signal.

The approach may involve implicitly disconnecting the load 503 of the power receiver by applying an electromagnetic test signal in the foreign object detection time interval at which the induced voltage at the power receiver is lower than the (minimum) voltage of the battery 905 (or e.g. capacitor). An advantageous result in many scenarios is to apply an electromagnetic test signal resulting in the induced voltage being just below the voltage required to make the rectifiers conduct. This allows for the maximum electromagnetic test signal level while keeping the load decoupled from the power transfer signal.

In the described approach, the system is during the adaptation time interval arranged to vary the test drive signal such that the electromagnetic test signal varies resulting in the voltage induced at the power receiver varying. Specifically, the level of the power transfer signal/induced signal may be varied during the adaptation time interval in order to determine a suitable value, and typically in order to detect the level at which the induced signal is sufficiently high for the rectifiers to begin conducting and power being provided to the battery. In many embodiments, the level of the power transfer signal may be varied directly by the voltage and/or current of the test drive signal being varied by the output circuit (e.g. by the supply voltage to the inverter being varied). In other embodiments, the power transfer signal may be varied by varying the frequency of the test drive signal (and thus of the power transfer signal and the induced signal). In embodiments using resonance output circuits, this will directly translate into a varying induced signal level at the power receiver. It will be appreciated that the parameter determined during the adaptation time interval and applied during subsequent foreign object detection time intervals may be the same as that varied during the adaptation time interval, and specifically may be a current, voltage, level, and/or frequency of the test drive signal. It will also be appreciated that in some embodiments, a plurality of parameters may be varied, determined and used in future foreign object detection time interval.

In some embodiments, the detection of a suitable operating condition may be performed in the power receiver 105 and this may communicate a message to the power transmitter 101 indicating that this detection has occurred. Specifically, the power receiver 105 may be arranged to measure the current that flows into a given circuit, typically an energy reservoir such as a battery or capacitor, and transmit a message to the power transmitter 101 to indicate when the current meets a specific condition. Typically, the power receiver 105 may be arranged to detect that current starts to flow into the circuit and transmit a message to the power transmitter 101 when this happens.

The message receiver 205 accordingly is arranged to receive the detection message from the power receiver 105 and when this happens, the adapter 213 is informed that the detection message has been received. The adapter 213 then proceeds to determine the test drive signal parameter value in response to this message. Typically, the detection message indicates a timing for the detection and the adapter 213 sets the test drive signal parameter value in response to the value of the varying parameter at the time indicated for the detection.

In some embodiments, the timing of the message may itself be an indication of the timing of the detection. For example, the adapter 213 may during an adaptation time interval slowly vary the frequency of a test drive signal from a value which is relatively far from the resonance frequency of the power transmitter and the power receiver towards a frequency close to this. This will result in the induced voltage increasing at the power receiver and at some stage this will exceed the voltage of the battery and current will begin to flow into this. The power receiver may continuously measure the current through the rectifiers and detect that a current starts to flow. In response, a detection message may be sent to the power transmitter and in response to receiving this, the power transmitter 101 may initiate the adapter 213 to note the current frequency and to determine a suitable frequency to apply during subsequent foreign object detection time intervals. For example, a predetermined frequency offset may be applied to the current value to generate a drive frequency for the electromagnetic test signal which will result in a relatively high electromagnetic test signal level yet ensure that the voltage induced at the power receiver is sufficiently low to ensure that the rectifiers do not conduct, and thus that the load is effectively decoupled from the power transfer signal.

Such an approach may be suitable for embodiments wherein the adaptation time interval is sufficiently long and the variation of the test drive signal is sufficiently slow to render the communication delay acceptable. Changes in the test drive signal parameter during the delay from the detection in the power receiver 105 to the determination of the parameter in the power transmitter may be compensated in the determination of the test drive signal parameter value, for example by applying a suitably large frequency offset which is larger than the frequency variation of the test drive signal during a maximum delay.

In other embodiments, the message from the power receiver may additionally or alternatively include data which directly indicates a time of the detection of the current flow. The power transmitter may then determine the test drive signal parameter value for the indicated time and use this parameter to set the preferred test drive signal parameter value for the foreign object detection time interval. Such an approach may in some embodiments allow a more accurate setting of the test drive signal parameter value, e.g. it may allow a smaller frequency offset to be used, but will tend to require a more accurate time synchronization between power transmitter and power receiver.

In some embodiments, the adapter 213 may be arranged to vary the parameter of the test drive signal during the adaptation time interval in response to messages from the power receiver. For example, the system may enter an adaptation mode wherein the power receiver sends control messages requesting that the power transmitter changes a given parameter of the test drive signal, such as the frequency or the amplitude, and the power transmitter may proceed to change the parameter accordingly. The power receiver may then for a new operating point measure whether the rectifiers conduct current. If not, it may request a change of the test drive signal parameter to increase the induced voltage/current at the power receiver and repeat the measurements. This may be repeated until the power receiver detects that the rectifiers do indeed conduct current. When this is detected, the power receiver may instead transmit a message indicating that this condition has been detected, and thus that the current setting of the parameter results in the load not being completely decoupled from the power transfer signal. The adapter 213 may then proceed to determine the test drive signal parameter value to be used for the foreign object detection time interval based on the current level of the test drive signal parameter, or e.g. based on a previous level (e.g. it may set it to the highest level for which no current flow through the rectifiers are detected).

Power receiver based approaches may provide accurate determination of a suitable test drive signal parameter value in many embodiments. However, it may add complexity and specifically require that power receivers are compatible with such an operation. This may e.g. not be the case for all legacy power receivers if the approach is introduced to an already deployed system.

In some embodiments, the power transmitter may be arranged to detect a suitable operating point without relying on messages from the power receiver. The adapter 213 may be arranged to measure a signal property of the test drive signal when varying the test drive signal, such as the frequency, current, voltage, power, amplitude, or level of the test drive signal. The test drive signal parameter value may then be determined in response to the measured signal property. The measured signal property is typically different from the one that is varied by the adapter 213. For example, the adapter 213 may vary the frequency of the test drive signal and may further measure the power extracted from the power transmitter, e.g. by measuring the current provided to the transmitter coil 103 and/or the voltage (amplitude) of the test drive signal. It may then determine the test drive signal parameter value based on this measurement, and typically may determine the test drive signal parameter value from the value of the parameter of the test drive signal being varied at a time when the measured property meets a given condition. For example, the test drive signal parameter value may be determined from the test drive signal frequency when the measured current or voltage meets a specific criterion.

As a simple example, the test drive signal parameter value may be a frequency which is determined as a frequency corresponding to a predetermined frequency offset relative to the frequency for which the measured current or voltage exceeds a given level.

In many embodiments, the adapter 213 may be arranged to determine the test drive signal parameter value in response to a rate of change of the signal property. The rate of change may be determined relative to the rate of change of the parameter being varied (which typically may be equivalent to the rate of change with respect to time), such as specifically the rate of change of a measured (amplitude of a) current or voltage of the drive signal with respect to the change in the frequency. The adapter 213 may then detect a specific operating condition by evaluating the rate of change and the test drive signal parameter value may be determined based on the value of the varied parameter when this operating condition is detected. For example, in some embodiments, the test drive signal parameter value may be determined by applying a fixed frequency offset to the test drive signal frequency when it is detected that a rate of change of the current provided to the transmitter coil 103 exceeds a given predetermined threshold.

In many embodiments, the adapter 213 may be arranged to determine the test drive signal parameter value in response to a value of the test drive parameter when detecting a change in the rate of change of the signal property. Specifically, in many embodiments, the point at which the rectifiers of the power receiver start to conduct, and thus the point at which the power receiver starts to extract power from the power transfer signal (and to couple the load to the power transfer signal) may be detected by a change in the rate of change of the measured (amplitude of the) current and/or voltage of the test drive signal. In many scenarios, the detection of such a change in the rate of change of the measured parameter may provide a more accurate detection than a detection based on the measured property increasing above a threshold.

The exact point at which the rectifiers start to conduct typically also depends on the voltage over the battery/capacitor. However, provided the energy reservoir provided is sufficiently large for the duration of the adaptation interval and the maximum load experienced, the voltage may be relatively constant during the adaptation interval. In other embodiments, the decrease in the energy reservoir voltage may be compensated for which determining the test drive parameter value. In some embodiments, the loading of the energy reservoir may be reduced during the adaptation interval, e.g. by disconnecting the load 503 during the adaptation interval.

As described previously, the driver 201 and/or the test generator 211 may be implemented with an output circuit in the form of a full bridge or half bridge switch circuit. In some embodiments, where the driver 201 and the test generator 211 are implemented using the same output circuit, the output circuit of the driver 201 may be a full bridge switch output circuit which generates the test drive signal during the foreign object detection time interval and the power transfer drive signal during power transfer intervals.

In some such embodiments, the operating mode for the full bridge switch output circuit may be changed/switched from a full bridge operational mode during the power transfer time intervals to a half bridge operational mode during the foreign object detection time intervals. Thus, the operation of the full bridge switch output circuit may be different in the time intervals depending on the purpose of the drive signal generated.

When the full bridge switch output circuit is operating in the full bridge mode, it is arranged to vary the voltage at both sides of (connections to) a power transfer output circuit comprising the transmitter coil 103 and driven by the drive signal from the full bridge switch output circuit. When the full bridge switch output circuit is operating in the half bridge mode, it is arranged to vary the voltage on only one side of (connections to) the power transfer output circuit comprising the transmitter coil 103 and driven by the drive signal from the full bridge switch output circuit. In other words, the full bridge switch output circuit provides two connections to a power transfer output circuit comprising the transmitter coil 103. In the full bridge mode, both of these connections experience a switched/varying voltage but in the half bridge mode one of the connections is kept at a substantially constant voltage.

In most embodiments, the voltage of the generated test drive signal is doubled when the full bridge switch output circuit operates in full bridge mode relative to when the full bridge switch output circuit operates in half bridge mode.

Figure 14:
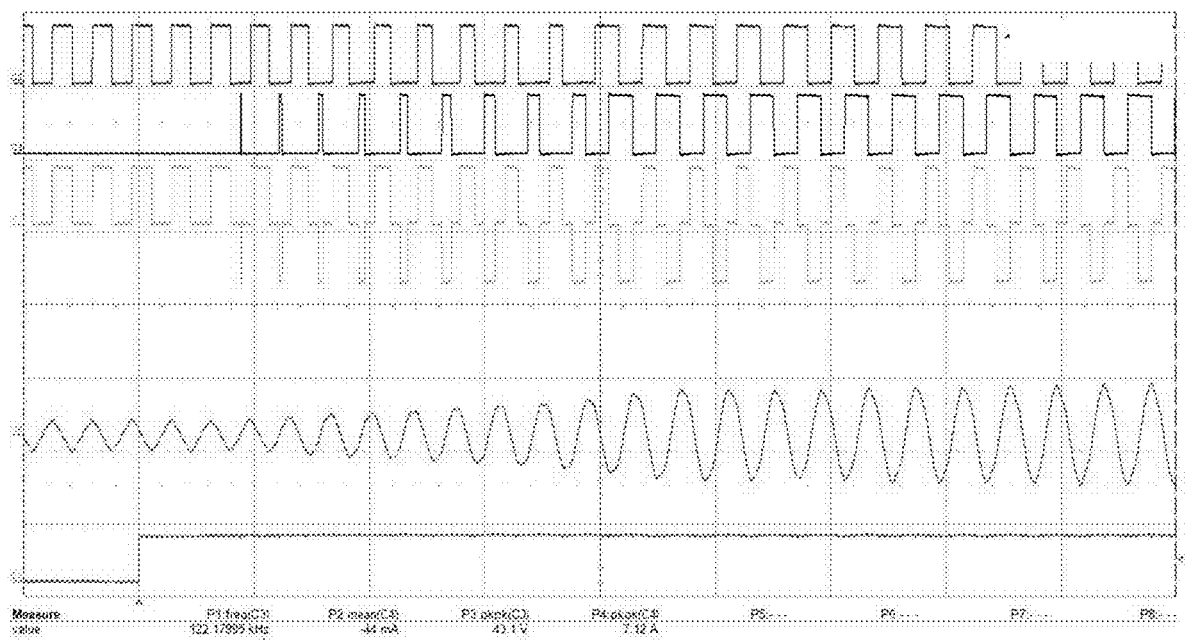

As a specific example, when the full bridge switch output circuit is operating in the full bridge mode, it may drive/switch the two legs of the bridge such that the voltage varies at the connection point for both legs. The drive signals may be controlled to vary the frequency of the driving of the two bridge legs Q1/Q2 and Q3/Q4 as well as the phase between the two legs, resulting in a square wave drive voltage with an amplitude of Udc and a duty cycle Duty, as illustrated in FIG. 14. This voltage drives a power transfer output circuit comprising the transmitter coil 103, and in the specific example also the resonant capacitor CTX.

When the full bridge switch output circuit is operating in the half bridge mode, the frequency of the drive/switch signal for one leg (for instance Q1/Q2) may be varied while keeping e.g. switch Q4 continuously shorted. This keeps one side of the power transfer output circuit at a constant voltage, resulting in a square wave drive voltage with an amplitude of 0.5*Udc, as illustrated in FIG. 14. This voltage accordingly drives the power transfer circuit which in the specific case comprises the transmitter coil 103 and the resonant capacitor CTX. In other words, the full bridge switch output circuit may effectively provide two circuit configurations for driving a power transfer output circuit comprising the transmitter coil 103 (and in the specific example also the resonant capacitor CTX). In the full bridge mode, both of these connections experience a switched/varying voltage but in the half bridge mode one of the connections is kept at a substantially constant voltage.

In the specific example, the full bridge switch output circuit (e.g. in the form of the inverter of FIG. 9) that drives the power transfer output circuit (which includes the transmitter coil 103 (LTX) and in the specific example also the resonant capacitor CTX) is controlled such that it operates in full-bridge mode while transferring power to the load, and in half-bridge mode during the foreign object detection time intervals. Moreover, the transition between the two modes is in many embodiments made gradual and occurs spread over a configurable time. This may in many scenarios ensure that the signal is stable when starting the measurements in the foreign object detection time interval and in addition mitigates audible noise and EMC problems.

Advantages of this approach include the following:

During power transfer, the inverter can operate in full-bridge mode and control the transmitted power by adjusting the frequency and/or the duty cycle (by controlling a phase shift between the left and right bridge leg) of the full-bridge. This allows for a wide control range of the power transfer, while keeping the frequency range limited, e.g. between 100 kHz and 142 kHz.

In half-bridge mode, the amplitude of the drive signal is halved (0.5*Udc) and this results in the leakage current to the load of the power receiver being significantly reduced compared to full-bridge mode with a drive signal of amplitude Udc but with a small duty cycle, while applying the same current in the transmitter coil. This also means that in half-bridge mode a significant higher transmitter coil current can be applied compared to the full-bridge mode with a small duty cycle while keeping the resulting leakage current to the load of the power receiver at the same level.

In many embodiments, the change/switch between the full bridge mode and the half bridge mode (in either direction) may be a gradual transition. In many embodiments, the transition may have a duration of no less than 100 μsec, 200

µsec, or 500 µsec. The transition may for example be made gradual by the gradual change of the duty cycle of one of the switch signals as shown in the example of FIG. 14. The duty cycle may for example be changed from approximately 50% when operating in the full bridge mode to substantially zero when operating in the half bridge mode (with typically the duty cycle of the switch signal for the other half of the full bridge output circuit being constant and typically approximately 50% in both modes of operation).

In many embodiments, the test drive signal parameter value is furthermore determined using the same operational mode as during the foreign object detection time interval, i.e. the driver 201/test generator 211 is arranged to operate in the half bridge mode during the adaptation time interval.

In the following, a specific example of such an approach will be described with reference to FIG. 9.

In the example, in the power transfer time intervals, the power transmitter controls the power transfer signal by adapting the frequency and the phase between the left and right bridge legs of the full bridge inverter.

In the foreign object detection mode, i.e. during foreign object detection time intervals, the power transmitter operates in half-bridge mode, e.g. by keeping Q4 shorted and Q3 open, and the electromagnetic test signal may be controlled by adapting the frequency of the test drive signal.

The power transmitter may measure the dissipated power by measuring DC power provided by a DC voltage source to the inverter. In addition, it may estimate the transmitted power (the power dissipated outside the power transmitter=power dissipated by the power receiver+power dissipated by any foreign object present) by subtracting losses in the inverter and resonant tank.

For a given electromagnetic test signal for which the input power to the inverter is measured with no foreign object present, a change (increase) of the input power indicates that power dissipation may occur in a foreign object (provided the that the power dissipation in the power transmitter and power receiver has not been changed).

Prior to the adaptation time interval, it may have been determined that no foreign object is present and accordingly the system may proceed to determine a suitable setting for the test drive signal to generate a suitable electromagnetic test signal, and the result may be stored and used in subsequent foreign object detection time interval as previously described. The power transmitter may then during the foreign object detection time interval measure the input power to the inverter and calculate the difference to the value measured during the adaptation time interval. If this difference has increased above a given threshold, it may be determined that a foreign object has been detected.

The inverter is controlled such that it operates in a full bridge mode during the power transfer time intervals and in a half bridge mode during the adaptation time interval and the foreign object detection time intervals.

Figure 10:
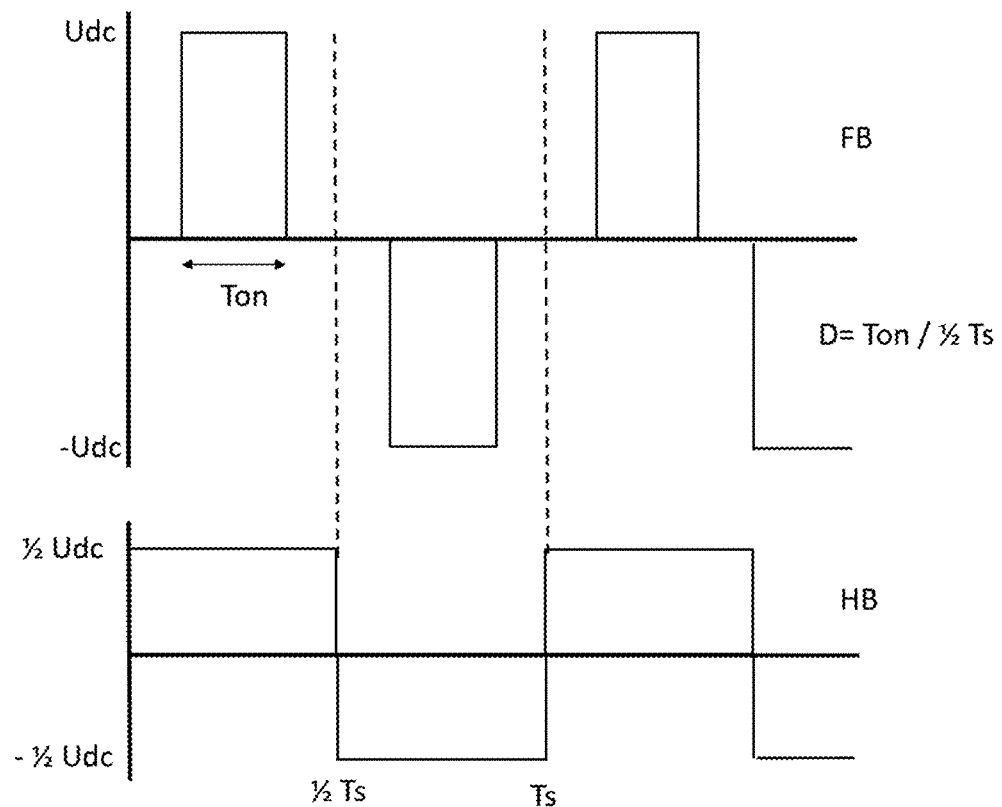
FIG. 10 illustrates an example of elements of test drive signals generated by respectively a full bridge and a half bridge inverter output circuit in accordance with some embodiments.
Figure 11:
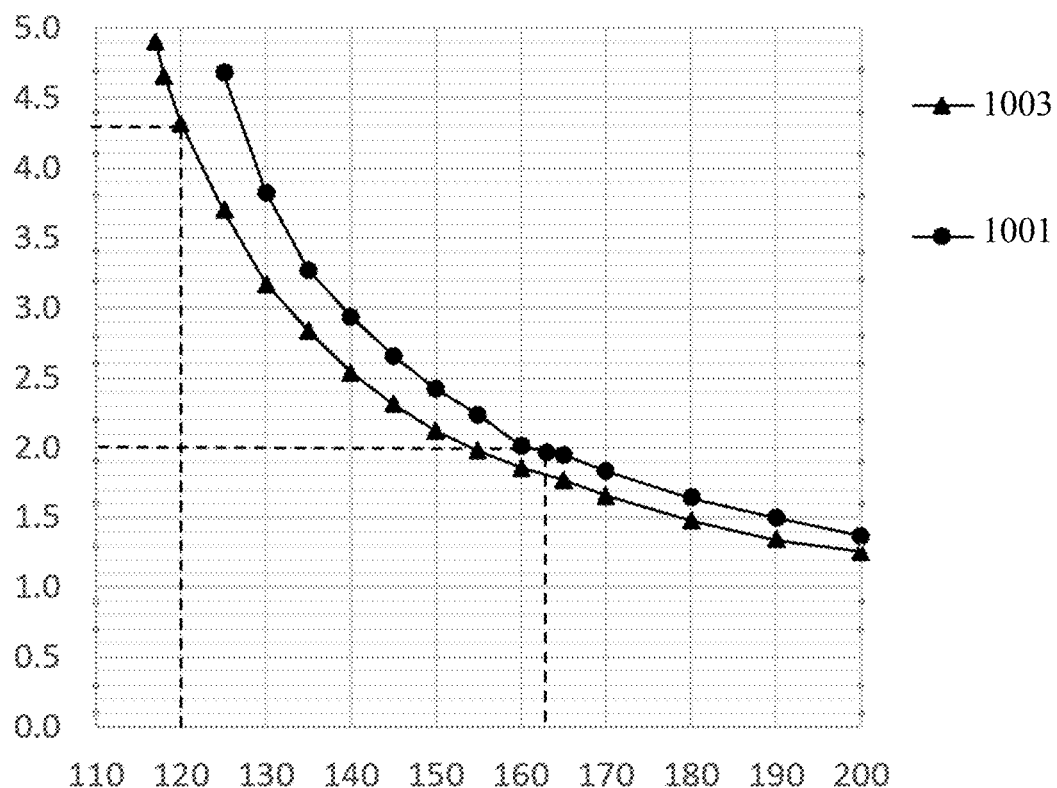
FIG. 11 illustrates an example of transmit coil current as a function of frequency for a power transmitter in accordance with some embodiments.

FIG. 10 illustrates an example of peak to peak transmitter coil current as function of the operating frequency for respectively a full bridge and half bridge inverter mode. One curve 1001 indicates the transmitter-coil current when operating in full-bridge mode with 50% duty cycle (90 degrees phase shift), while the second curve 1003 shows the transmitter-coil current when operating in half-bridge mode. In the example, it has been found that the rectifier of the power receiver starts to conduct at 165 kHz when applying the full-bridge mode and at 120 kHz when operating in the half-bridge mode. The resulting measured transmitter-coil currents for these two situations were respectively 2 A and 4.3 A peak-peak. Thus, the example shows that the half-bridge mode of operation has been found to have the advantage of generating a significantly higher electromagnetic test signal field before the rectifiers start to conduct. This provides for a substantially easier detection of power dissipation in a foreign object.

It will be appreciated that the duration of the gradual transition may be different in different embodiments and that the exact dynamic properties may depend on the individual preferences and requirements of the individual embodiment. However, in many embodiments, the duration of the transition from full bridge to half bridge mode, and from full bridge mode to half bridge mode, is no less than 10 mSec, 20 mSec, 30 mSec, 50 mSec or 100 mSec.

The gradual/soft transition between the two modes can be realized in various ways. One option is to gradually change the control timing for the left half bridge and the right half bridge of the full bridge switch output circuit.

For example, in full-bridge mode, the left-up control signal for Q1 is activated during 50% time of an operating cycle while the left-down control signal for Q2 is activated during the complementary 50% of the operating cycle. The same applies for Q3 and Q4. The duty cycle of the full-bridge operation is realized by shifting the phase between the Q1, Q2 combination and the Q3, Q4 combination.

In half-bridge mode one half of the full bridge e.g. the Q3, Q4 combination is controlled the same as in full-bridge mode, while for the other half, e.g. the Q1, Q2 combination, one part is kept open, e.g. Q1 while the other part is shorted, e.g. Q2. E.g. the left-up control signal for Q1 is activated during 0% time of an operating cycle, while the left-down control signal for Q2 is activated 100% time of an operating cycle.

The soft transition from full-bridge to half-bridge may then be realized by gradually changing the ratio of the activation time between upper- and lower control signals of one of the two legs from 50% up and 50% down to 0% up and 100% down. This soft transition from full-bridge to half bridge can be realized in e.g. 20 operating cycles, where in each cycle the upper leg is reduced with 2.5% of the operating cycle while the lower leg is increased with 2.5% of the operating cycle. The soft-transition from half-bridge to full-bridge may be achieved by the inverse operation.

Figure 12:
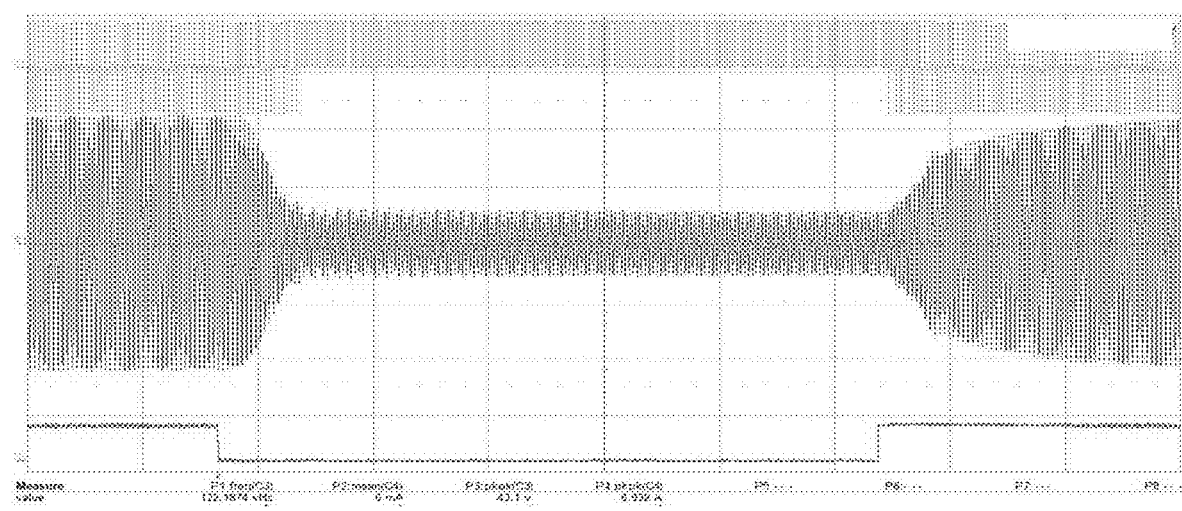
FIGS. 12-14 illustrate examples of transmit coil current as a function of frequency for a power transmitter in accordance with some embodiments.
Figure 13:
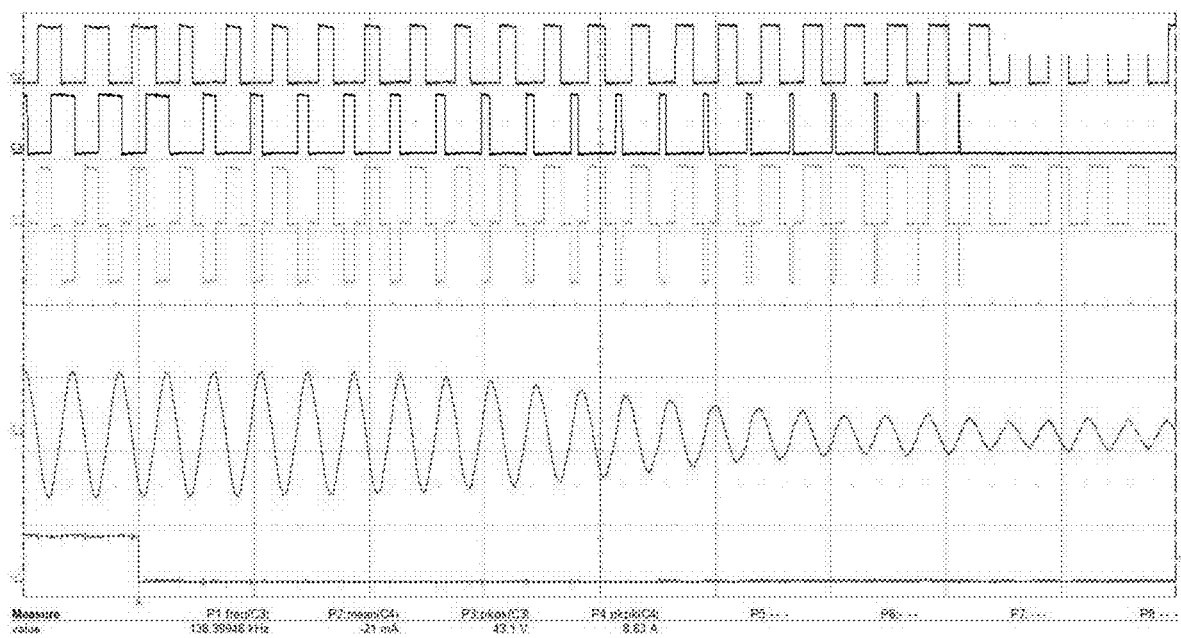

Examples of signals in an inverter operating in accordance with the above approach are shown in FIG. 12. In the figure, the top signal corresponds to the voltage of the test drive signal generated by the inverter, the middle figure shows the current through the transmitter coil 103, and the bottom signal is a control signal indicating the timing of the foreign object detection time interval. FIGS. 13 and 14 show the corresponding control signals for the transistors of the inverter for respectively the transition from the full bridge mode to the half bridge mode, and for the transition from the half bridge mode to the full bridge mode.

It will be appreciated that in most embodiments, the parameter for which the value is determined during the adaptation time interval is the same as the parameter that is being varied. For example, the adapter 213 may vary the voltage of the test drive signal and determine the voltage for which e.g. the current starts to increase (indicating that the rectifiers of the power receiver begin to conduct). The voltage of the test drive signal to use in subsequent foreign object detection time intervals may then be determined as e.g. the detected voltage reduced by a given margin. The same approach may e.g. be used for the current, signal level, amplitude, or frequency.

In other embodiments, the parameter being varied and the parameter for which the value is determined may be different. For example, the adapter 213 may vary the voltage and detect when the current starts to increase substantially. The current for subsequent foreign object detection time interval may then be limited to not exceed the detected level.

In other embodiments, the adapter 213 may vary one parameter and detect a value for which a given event occurs (e.g. the current increases or a message is received from the power receiver). It may then determine a value for another parameter based on the determined value of the parameter being varied.

For example, the adapter 213 may for a given unchanged frequency vary the voltage and detect when the current increases (the power receiver rectifiers start to conduct). The voltage for which this happens may then be used as an input parameter for a table look-up in a predetermined look up table that relates voltages to frequencies. For example, during the design or manufacturing phase, a number of tests may have been performed to relate suitable frequencies to detected voltages and based on this a look-up table may have been generated. In some embodiments, tests may have been performed to determine a formula for relating parameter values of a varied parameter to suitable values of another parameter, and the adapter 213 may use these to determine a suitable parameter value.

It will be appreciated that the above description for clarity has described embodiments with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment may be physically, functionally and logically implemented in any suitable way. Indeed the functionality may be implemented in a single unit, in a plurality of units or as part of other functional units. As such, the embodiments may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:
   a wireless power transmitter circuit configured to generate a power transfer signal;
   a driver circuit configured to generate a drive signal for the wireless power transmitter circuit during a power transfer time interval;
   a foreign object detection circuit configured to perform a foreign object detection test during a foreign object detection time interval in response to a measured parameter for the test drive signal;
   an adapter circuit configured to generate a varying test drive signal during an adaptation time interval by varying at least one of a frequency, duty cycle, signal level, or amplitude of the test drive signal,
   wherein the adaptor circuit is configured to determine a test drive signal parameter value as the varying test drive signal is varied; and
   a memory circuit configured to store the test drive signal parameter value,
   wherein the foreign object detection circuit is configured to receive the test drive signal parameter value from the memory circuit, and
   wherein the foreign object detection circuit is configured to set a signal property of the test drive signal during a foreign object detection time interval based on the test drive signal parameter value,
   wherein the foreign object detection time interval and the adaptation time interval are distinct from each other.

2. The power transmitter of claim 1, further comprising a receiver circuit,
   wherein the receiver circuit is configured to receive messages from a power receiver,
   wherein the adapter circuit is configured to determine the test drive signal parameter value in response to a message received from the power receiver.

3. The power transmitter of claim 1, wherein the adapter circuit is configured to determine the test drive signal parameter value at a time indicated by the message received from the power receiver in response to a varying property of the varying test drive signal.

4. The power transmitter of claim 1,
   wherein the adapter circuit is configured to measure the signal property of the test drive signal when varying the test drive signal, and
   wherein the adapter circuit is configured to determine the test drive signal parameter value in response to the signal property.

5. The power transmitter of claim 1, wherein the adapter circuit is configured to determine the test drive signal parameter value in response to a rate of change of the signal property.

6. The power transmitter of claim 5, wherein the adapter circuit is configured to determine the test drive signal parameter value in response to a value of the test drive parameter when detecting a change in the rate of change of the signal property.

7. The power transmitter of claim 1,
wherein the signal property of the test drive signal is a current or voltage of the test drive signal, and
wherein the test drive signal parameter value is a frequency of the test drive signal.

8. The power transmitter of claim 1, further comprising a test generator circuit,
wherein the test generator circuit comprises a full bridge switch output circuit,
wherein the test generator circuit is configured to generate the test drive signal, and
wherein the test generator circuit is configured to change an operating mode for the full bridge switch output circuit from a full bridge operational mode during at least one power transfer time intervals to a half bridge operational mode during at least one foreign object detection time interval.

9. The power transmitter of claim 1, wherein the adapter circuit is configured to determine the test drive signal parameter value in response to a value of a property of the varying test drive signal when the power receiver begins to extract power from the test drive signal.

10. The power transmitter of claim 1, wherein the wireless power transmitter circuit, the foreign object detection circuit, and the adapter circuit use a same coil for generating an electromagnetic field.

11. The power transmitter of claim 1, wherein the adapter circuit is configured to gradually change the signal property of the test drive signal from an initial value to the test drive signal parameter value during at least one foreign object detection time interval.

12. A wireless power receiver comprising:
a power receiving circuit configured to extract power from a power transfer signal,
wherein the power receiving circuit is configured to receive a test drive signal during a foreign object detection adaptation time interval from a wireless power transmitter; and
a message transmitter circuit, configured to transmit a foreign object detection configuration message to the wireless power transmitter,
wherein the foreign object detection configuration message comprises an indication of a time at which the wireless power transmitter is to determine a signal property of a varying test drive signal for foreign object detection, and
wherein the wireless power receiver is configured to receive, from the wireless power transmitter, during a foreign object detection time interval, a foreign object detection signal based on the indicated time in the foreign object detection configuration message.

13. The wireless power receiver of claim 12,
wherein the message comprises an indication that the wireless power receiver has initiated extraction of power from the test drive signal.

14. A non-transitory computer readable medium having stored thereon instructions that when executed by a processor cause processing circuitry of a wireless power transmitter to:
generate a power transfer signal;
generate a drive signal for a wireless power transmitter circuit during a power transfer time interval,
perform a foreign object detection test during a foreign object detection time interval in response to a measured parameter for the test drive signal;
generate a varying test drive signal during an adaptation time interval by varying at least one of a frequency, duty cycle, signal level, or amplitude of the test drive signal,
wherein the foreign object detection time interval and the adaptation time interval are distinct from each other,
determine a test drive signal parameter value; and
store the test drive signal parameter value in a memory,
receive the test drive signal parameter value from the memory; and
set a signal property of the test drive signal during a foreign object detection time interval based on the test drive signal parameter value.

15. The non-transitory computer readable medium of claim 14, further comprising instructions that when executed cause the processing circuitry of the wireless power transmitter to receive messages from a power receiver and determine the test drive signal parameter value in response to a message received from the power receiver.

16. The non-transitory computer readable medium of claim 14, further comprising instructions that when executed cause the processing circuitry of the wireless power transmitter to determine the test drive signal parameter value in response to a varying property of the varying test drive signal at a time indicated by the message received from the power receiver.

17. The non-transitory computer readable medium of claim 14, further comprising instructions that when executed cause the processing circuitry of the wireless power transmitter to measure a signal property of the test drive signal when varying the test drive signal,
wherein the test drive signal parameter value is based on the signal property.

18. The non-transitory computer readable medium of claim 17, further comprising instructions that when executed cause the processing circuitry of the wireless power transmitter to determine the test drive signal parameter value in response to a rate of change of the signal property.

19. The non-transitory computer readable medium of claim 18, further comprising instructions that when executed cause the processing circuitry of the wireless power transmitter to determine the test drive signal parameter value in response to a value of the test drive parameter when detecting a change in the rate of change of the signal property.

20. The non-transitory computer readable medium of claim 14, further comprising instructions that when executed cause the processing circuitry of the wireless power transmitter to gradually change a signal property of the test drive signal from an initial value to the test drive signal parameter value during at least one foreign object detection time interval.

* * * * *